(12) United States Patent
Okuyama et al.

(10) Patent No.: US 6,490,095 B2
(45) Date of Patent: Dec. 3, 2002

(54) IMAGE DISPLAY APPARATUS

(75) Inventors: Atsushi Okuyama, Tokorozawa; Tatsuo Chigira, Utsunomiya; Junko Kuramochi, Ninomiya-machi; Takashi Sudo, Utsunomiya, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/812,698

(22) Filed: Mar. 21, 2001

(65) Prior Publication Data

US 2002/0015114 A1 Feb. 7, 2002

(30) Foreign Application Priority Data

| Mar. 23, 2000 | (JP) | 2000-082087 |
| Mar. 23, 2000 | (JP) | 2000-082088 |
| May 15, 2000 | (JP) | 2000-141437 |

(51) Int. Cl.[7] .................... G02B 27/14; G02B 9/08
(52) U.S. Cl. .................. 359/631; 359/738; 359/630; 359/633
(58) Field of Search .................. 359/630, 631, 359/633, 720, 738

(56) References Cited

U.S. PATENT DOCUMENTS

| RE27,356 E | 5/1972 | La Russa .................... 359/494 |
| 4,026,641 A | 5/1977 | Bosserman et al. ......... 359/869 |
| 4,081,209 A | 3/1978 | Heller et al. ................. 359/631 |
| 4,563,061 A | 1/1986 | Ellis ............................. 359/364 |
| 4,669,810 A | 6/1987 | Wood ........................... 340/908 |
| 4,775,217 A | 10/1988 | Ellis ............................. 313/524 |
| 4,874,214 A | 10/1989 | Cheysson et al. ............. 359/15 |

(List continued on next page.)

FOREIGN PATENT DOCUMENTS

| EP | 0 380 035 | 8/1990 |
| EP | 0 408 344 | 1/1991 |
| EP | 0 556 598 | 8/1993 |
| EP | 0 583 116 | 2/1994 |
| EP | 0 618 471 | 10/1994 |
| EP | 0 687 932 | 12/1995 |
| GB | 1 578 136 | 11/1980 |
| GB | 2 246 900 | 2/1992 |
| JP | 58-78116 | 5/1983 |
| JP | 62-214782 | 9/1987 |
| JP | 1-274736 | 11/1989 |
| JP | 2-297516 | 12/1990 |
| JP | 3-101709 | 4/1991 |
| JP | 3-109029 | 5/1991 |
| JP | 4-242630 | 8/1992 |
| JP | 4-343313 | 11/1992 |
| JP | 5-303056 | 11/1993 |
| JP | 7-333551 | 12/1995 |
| JP | 11-125791 | 5/1999 |

*Primary Examiner*—Loha Ben
*Assistant Examiner*—David N. Spector
(74) *Attorney, Agent, or Firm*—Fitzpatrick, Cella, Harper & Scinto

(57) ABSTRACT

An image display apparatus includes a light source for supplying illumination light, a reflective display element for reflecting and modulating the illumination light into image light, a first optical system for guiding the illumination light to the reflective display element, and a second optical system for guiding the image light to an observer. Particularly, the first optical system has an optical element including a first surface on which the illumination light is incident, a second surface for totally reflecting the light incident on the first surface, and a third surface from which the light totally reflected by the second surface emerges toward the reflective display element. The first optical system is arranged so that the image light is again incident through the third surface on the optical element and emerges from the second surface toward the second optical system. The optical element has a function of preventing unnecessary light from being guided to the observer, by making a side surface of the optical element as a diffusing surface, or by providing a side surface of the optical element with a light absorbing film or with an antireflection coating.

21 Claims, 26 Drawing Sheets

U.S. PATENT DOCUMENTS

| | | | | |
|---|---|---|---|---|
| 4,969,724 A | | 11/1990 | Ellis | 359/364 |
| 4,989,960 A | * | 2/1991 | Thomas | 359/738 |
| 5,093,567 A | | 3/1992 | Staveley | 250/221 |
| 5,384,654 A | | 1/1995 | Iba | 359/364 |
| 5,416,876 A | | 5/1995 | Ansley et al. | 385/116 |
| 5,430,634 A | | 7/1995 | Baker et al. | 362/32 |
| 5,436,763 A | | 7/1995 | Chen et al. | 359/565 |
| 5,436,765 A | | 7/1995 | Togino | 359/631 |
| 5,459,612 A | | 10/1995 | Ingleton | 359/630 |
| 5,479,224 A | | 12/1995 | Yasugaki et al. | 353/101 |
| 5,483,307 A | | 1/1996 | Anderson | 353/98 |
| 5,486,841 A | | 1/1996 | Hara et al. | 345/8 |
| 5,513,041 A | | 4/1996 | Togino | 359/631 |
| 5,539,422 A | | 7/1996 | Heacock et al. | 345/8 |
| 5,546,227 A | | 8/1996 | Yasugaki et al. | 359/630 |
| 5,589,956 A | | 12/1996 | Morishima et al. | 359/15 |
| 5,594,588 A | | 1/1997 | Togino | 359/631 |
| 5,598,248 A | | 1/1997 | Nagano et al. | 396/51 |
| 5,625,493 A | | 4/1997 | Matasumura et al. | 359/630 |
| 5,640,632 A | | 6/1997 | Koyama et al. | 396/382 |
| 5,671,062 A | | 9/1997 | Nakamura | 359/687 |
| 5,701,202 A | | 12/1997 | Takahashi | 359/631 |
| 5,734,505 A | | 3/1998 | Togino et al. | 359/631 |
| 5,768,024 A | | 6/1998 | Takahashi | 359/631 |
| 5,836,667 A | | 11/1998 | Baker et al. | 362/32 |
| 5,875,056 A | | 2/1999 | Takahashi | 359/633 |
| 6,018,423 A | | 1/2000 | Takahashi | 359/633 |
| 6,124,977 A | * | 9/2000 | Takahashi | 359/566 |
| 6,139,157 A | | 10/2000 | Okuyuma | 353/102 |
| 6,195,207 B1 | | 2/2001 | Takahashi | 359/637 |
| 6,285,515 B1 | * | 9/2001 | Kitazawa et al. | 359/726 |
| 6,313,950 B1 | * | 11/2001 | Hayakawa et al. | 359/630 |
| 2001/0021068 A1 | * | 9/2001 | Togino et al. | 359/630 |
| 2002/0015114 A1 | * | 2/2002 | Okuyama et al. | 349/5 |
| 2002/0018185 A1 | * | 2/2002 | Kuramochi et al. | 353/69 |
| 2002/0018295 A1 | * | 2/2002 | Okuyama et al. | 359/443 |
| 2002/0021498 A1 | * | 2/2002 | Ohtaka et al. | 359/629 |

* cited by examiner

IMAGE DISPLAY APPARATUS

BACKGROUND OF THE INVENTION

1. Field of the Invention

The present invention relates to image display apparatus so called head-mounted displays and the like.

2. Related Background Art

For the image display apparatus such as the head-mounted displays and the like, various proposals have been made heretofore on optical systems for compactification of the entire apparatus. For example, Japanese Patent Application Laid-Open No. 7-333551 (corresponding to EP687932A3) describes a proposal on an apparatus using an optical element of prism shape composed of first, second, and third rotationally asymmetric surfaces and constructed to display an enlarged image through the three surfaces of the optical element from an image on a display surface of an image display element.

By use of the optical element of such prism shape, it becomes feasible to correct distortion of image, curvature of field, and astigmatism well in very compact and simple structure and satisfy the telecentric condition to the display surface.

At the time of this proposal of the above application, it was common practice to use a transmissive liquid crystal display as the image display element. However, since pixel apertures are small in the transmissive liquid crystal displays, the transmissive liquid crystal displays have the drawback that it is difficult to achieve both high pixel density and compactification. In recent years, in addition to motion pictures of videos, TVs, and so on, output devices of high-definition images such as personal computers, DVDs, and so on have been increasing and there are desires for display of much higher definition images.

Under such circumstances, high-definition images can be obtained by use of reflective liquid crystal displays having larger pixel apertures while achieving the compactification. An example of the display devices using the reflective liquid crystal displays proposed so far is one proposed in Japanese Patent Application Laid-Open No. 11-125791. This application discloses the display device, as illustrated in FIG. 1 of the present application, in which rays 113 from a light source 112 are guided directly onto a reflective liquid crystal display 108 without passing through an optical element and in which an image of the liquid crystal display 108 is displayed as an enlarged virtual image by an optical element 110 of prism shape to be guided to the eye 101 of an observer.

In this display device, however, since the rays 113 from the light source 112 illuminating the reflective liquid crystal display 108 are guided directly onto the liquid crystal display 108, an angle a is large between the illumination light 113 and the optical axis of the liquid crystal display 108. For this reason, the entire display device becomes large in scale and, in addition, since the liquid crystal display is largely inclined relative to the optical element 110, distances between the optical element 110 and the liquid crystal display 108 are largely different depending upon locations, which poses a problem of degradation of optical performance.

Another display device disclosed in the Japanese Patent Application Laid-Open No. 11-125791 is constructed, as illustrated in FIG. 2, in such structure that the light source 112 is disposed on the opposite side to the reflective liquid crystal display 108 with respect to the optical element 110 of the prism shape, the illumination light 113 from the light source 112 illuminates the liquid crystal display 108 through the optical element 110, and the light illuminating the liquid crystal display 108 is reflected by this liquid crystal display 108 and travels again through the optical element 110 into the observer's eye 101.

With the illumination system of the display device of this type, however, the illumination light is reflected on each of the surfaces of the optical element 110, so that light not illuminating the liquid crystal display 108 also enters the eye 101, thus posing a problem of occurrence of unwanted flare.

SUMMARY OF THE INVENTION

An object of the present invention is to provide image display apparatus using the reflective display element ready for high-definition images of output from personal computers and the like and image display apparatus in extremely simple and compact structure without occurrence of unnecessary light, which can be the cause of flare, ghost, and so on.

In order to accomplish the above object, an image display apparatus of one embodiment of the present invention comprises a light source for supplying illumination light, a reflective display element for reflecting and modulating the illumination light into image light, a first optical system for guiding the illumination light to the reflective display element, and a second optical system for guiding the image light to an observer; particularly, the first optical system has an optical element comprising a first surface into which the illumination light is incident, a second surface for totally reflecting the light incident into the first surface, and a third surface from which the light totally reflected by the second surface emerges toward the reflective display element, the first optical system is arranged so that the image light is again incident through the third surface into the optical element and emerges from the second surface toward the second optical system, and the optical element has a function of preventing unnecessary light from being guided to the observer, by making a side surface of the optical element as a diffusing surface, or by providing a side surface of the optical element with a light absorbing film or with an antireflection coating.

An optical system of another embodiment of the present invention comprises a first optical system for guiding illumination light to a reflective display element, and a second optical system for guiding image light reflected by the reflective display element, to an observer; particularly, the first optical system has an optical element comprising a first surface into which the illumination light is incident, a second surface for totally reflecting the light incident into the first surface, and a third surface from which the light totally reflected by the second surface emerges toward the reflective display element, the first optical system is arranged so that the image light is again incident through the third surface into the optical element and emerges from the second surface toward the second optical system, and the optical element has a function of preventing unnecessary light from being guided to the observer, by making a side surface of the optical element as a diffusing surface, or by providing a side surface of the optical element with a light absorbing film or with an antireflection coating.

BRIEF DESCRIPTION OF THE DRAWINGS

FIGS. 43A and 43B are explanatory diagrams of the illumination system in the head-mounted display of the eighteenth embodiment of the present invention.

DETAILED DESCRIPTION OF THE PREFERRED EMBODIMENTS

First Embodiment

Figure 1:
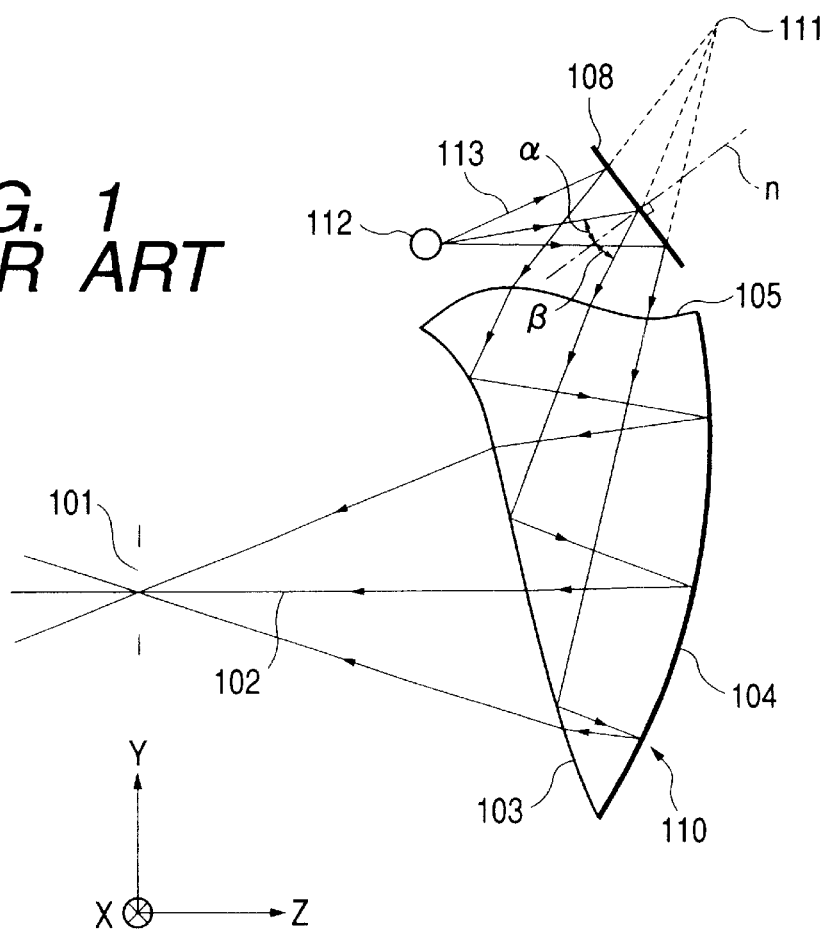
FIG. 1 is a structural diagram to show the main part of a conventional display device using the reflective liquid crystal display.
Figure 2:
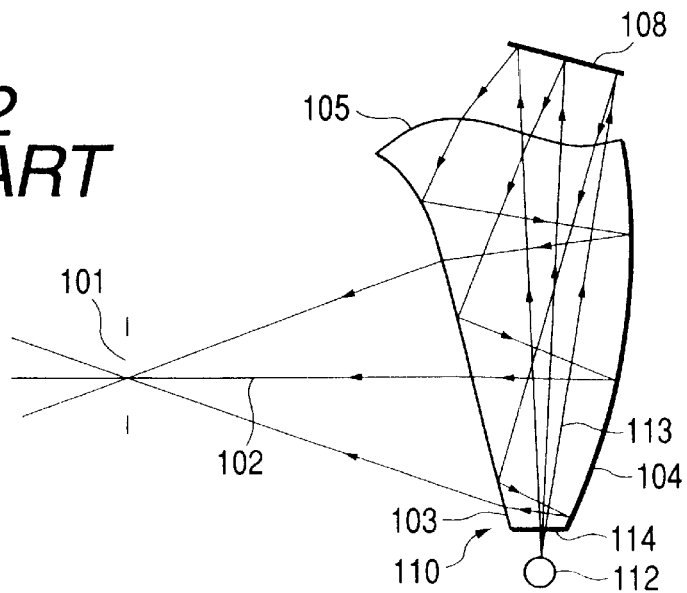
FIG. 2 is a structural diagram to show the main part of another conventional display device using the reflective liquid crystal display.
Figure 3:
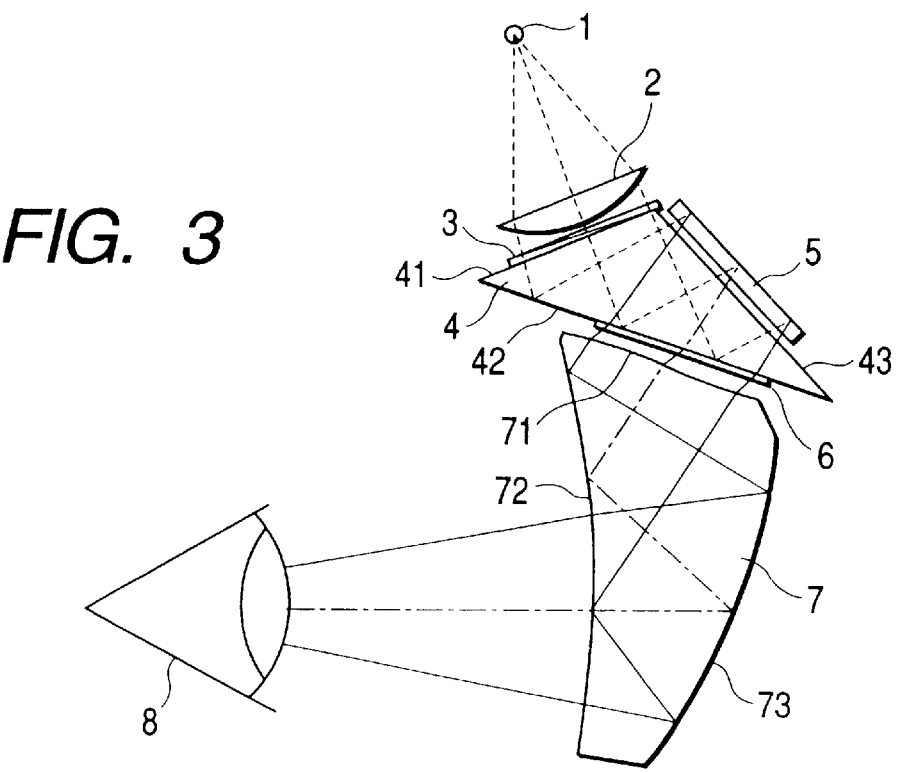
FIG. 3 is a structural diagram to show the main part of a head-mounted display as a first embodiment of the present invention.

FIG. 3 shows the structure of a head-mounted display (image display apparatus) as a first embodiment of the present invention.

Numeral 1 designates a light source for emitting light of R, G, and B, 2 a lens (condensing element) for condensing the light from the light source, 3 a first polarizer, and 4 an illumination prism (light guide element). This illumination prism 4 is an optical element of prism shape the interior of which is filled with a medium having a refractive index larger than 1, e.g., optical glass. Numeral 5 denotes a reflective liquid crystal display panel (reflective image display element), 6 a second polarizer, 7 a prism lens (projection optical element), and 8 the observer's eye.

The optical action will be described below referring to FIG. 3 and FIG. 4. The diverging light emitted from the light source 1 is converted into nearly parallel light by the lens 2 and the nearly parallel light travels through the first polarizer 3 to be converted into light polarized in a first polarization direction. The polarized light is transmitted through a first surface (entrance surface) 41 of the illumination prism 4 and then is reflected by a second surface (reflective/transmissive surface) 42. The reflected light is further transmitted through a third surface (transmissive surface) 43 to be incident from the image light emission side of the display panel 5 thereinto, thereby illuminating this panel 5.

A reflective film may be provided on a part of the second surface 42 of the illumination prism 4. Specifically, where R represents the reflectance of the region without the reflective film in the second surface 42, the aforementioned reflective film is provided on the region with the reflectance of R<1. In this structure, part of the illumination light is totally reflected by the region without the reflective film in the second surface 42 while the other part is reflected by the reflective film, thereby illuminating the display panel 5.

In the display panel 5, directions of polarization of the light are modulated according to video signals. Then the light reflected by the panel 5 is again transmitted through the third surface 43 of the illumination prism 4 and is further transmitted through the second surface 42 to enter the second polarizer 6. This second polarizer 6 transmits the component of polarization parallel to a second polarization direction perpendicular to the first polarization direction, but absorbs the polarization component normal to the second polarization direction. This allows the image light to enter the prism lens 7 in a state without unnecessary light.

Since the illumination light and the image light travel in the same region between the second surface 42 and the third surface 43 of the illumination prism 4 as described above, it becomes feasible to implement the illumination of the display panel 5 and the guide of the image light to the prism lens 7 by the compact optical system. This enables compactification of the illumination system and, in turn, compactification of the entire image display apparatus.

Figure 4:
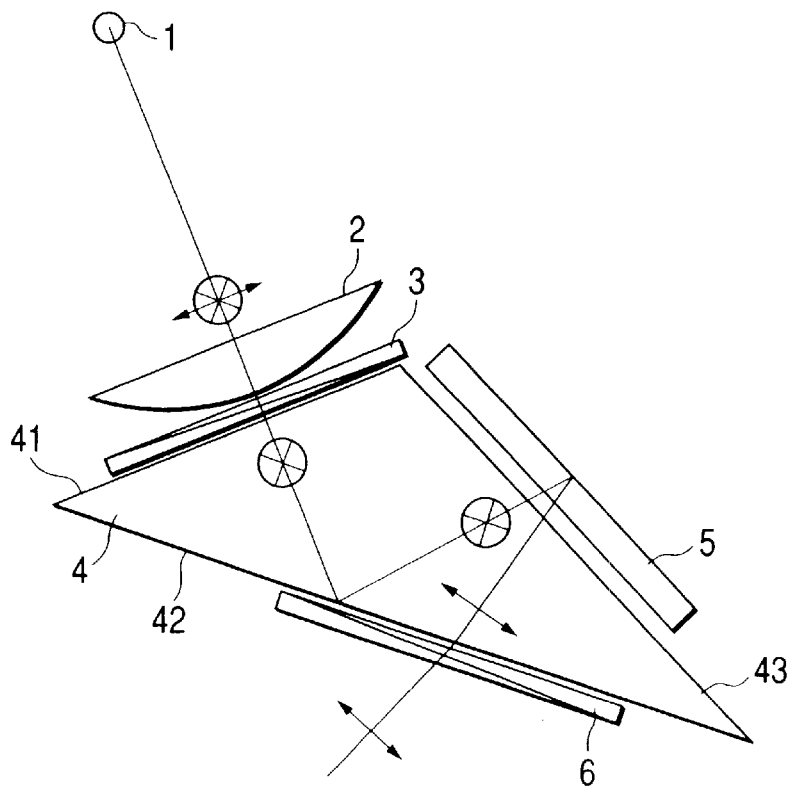
FIG. 4 is an enlarged view of the illumination system in the head-mounted display of the first embodiment.

FIG. 4 shows an example of polarization states of the illumination light and the image light. In FIG. 4 arrow marks indicate the state of P-polarization relative to the second surface 42 and cross marks in a circle the state of S-polarization. FIG. 4 shows a state in which P-polarized light resulting from modulation of the polarization direction by 90° in the display panel 5 is used as the image light. It is, however, noted that the light modulated by the display panel 5 does not always have to be the P-polarized light in particular, but it may be light polarized in an arbitrary direction.

The light transmitted through the second polarizer 6 travels through a first surface 71 of the prism lens 7, is totally reflected by a second surface 72, is reflected by a third surface 73, is transmitted through the second surface 72, and thereafter reaches the observer's eye 8. The prism lens 7 has a positive refracting power and has the action to convert the image displayed on the display panel 5, into an enlarged virtual image. Since the three surfaces 71 to 73 constituting the prism lens 7 are rotationally asymmetric curved surfaces (free-form surfaces), they can satisfactorily correct various aberrations (distortion etc.) of image to permit observation of good images.

The illumination prism 4 is disposed between the prism lens 7 and the display panel 5 and is constructed so that the second surface 42 on the prism lens 7 side and the third surface 43 on the panel 5 side make a predetermined angle.

The above described is the main structure and optical action of the image display apparatus of the present embodiment, and in the present embodiment an antireflection coating or light absorbing film is provided on each of side surfaces (surfaces not associated with the optical action) of the illumination prism 4 and the prism lens 7 to prevent reflection of light on each side surface, thereby preventing occurrence of flare and ghost.

In the present embodiment, the light source 1 is a white light source and each pixel of the display panel 5 is provided with a color filter of red, green, and blue (R, G, and B) not illustrated. This permits display of a full-color image.

In the image display apparatus to observe the virtual image like the head-mounted display of the present embodiment, when the light (e.g., the sunlight) is incident from the observer's eye 8 side, e.g., during unused periods of the apparatus, the light is converged near the display panel 5 because of the optical action of the prism lens 7. In the configuration wherein the second polarizer 6 is disposed near the display panel 5, a point of convergence appears near the second polarizer 6. Since the light entering from the eye 8 side is non-polarized light, the second polarizer 6 absorbs the light, which can deteriorate the second polarizer 6.

In the present embodiment the first and second polarizers 3, 6 are thus disposed in the vicinity of or in contact with the first surface 41 and the second surface 42 of the illumination prism 4, and the second polarizer 6 is located at the position apart from the display panel 5 (for example, at the position where the intensity of the light on the second polarizer 6 becomes not more than one tenth of the intensity of the light on the display panel 5).

This prevents the light entering from the eye 8 side of the prism lens 7 from being converged on the polarizers 3, 6, and thus prevents the deterioration of each polarizer 3, 6.

Second Embodiment

Figure 5:
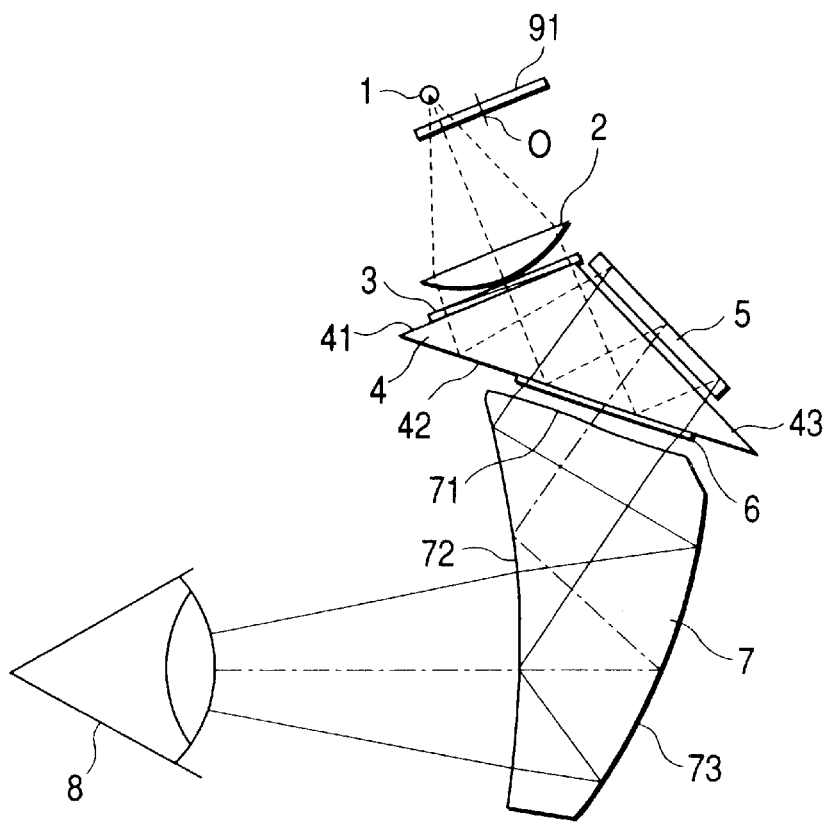
FIG. 5 is a structural diagram to show the main part of a head-mounted display as a second embodiment of the present invention.

FIG. 5 shows a head-mounted display (image display apparatus) as a second embodiment of the present invention. The basic structure of the head-mounted display of the present embodiment is substantially the same as that in the first embodiment and components common to them are denoted by the same reference symbols as those in the first embodiment.

Figure 6:
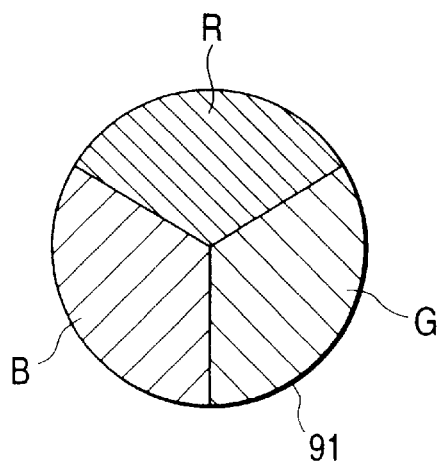
FIG. 6 is an explanatory diagram to illustrate a rotary color filter used in the head-mounted display of the second embodiment.

In the present embodiment, the light source 1 is a white light source, a rotary color filter (color switching means) 91 for selectively transmitting either of color component beams of R (red), G (green), and B (blue) as illustrated in FIG. 6 is disposed between the light source 1 and the illumination prism 4, and this filter 91 is rotated about the center of the axis O to time-sequentially switch the colors of the illumination light entering the display panel 5 through the illumination prism 4. Further, the apparatus is constructed in structure capable of presenting display of a full-color image by control (field sequential control) to time-sequentially switch display of the display panel 5 among color images corresponding to the colors of the illumination light in synchronism with the switching of the illumination light.

Since the field sequential control is performed to switch among the colors of the illumination light entering the display panel 5 and among the color images displayed on the panel 5 as described above, this configuration permits all the pixels of the display panel 5 to be used for display of image information concerning one color at a certain time and thus permits a high-definition image to be obtained without pixel deviation among the colors.

Figure 7A:
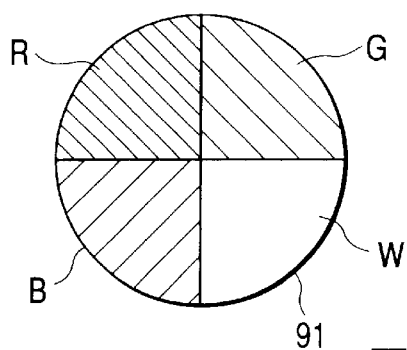
FIGS. 7A, 7B, and 7C are explanatory diagrams to illustrate modification examples of the rotary color filter used in the head-mounted display of the second embodiment.
Figure 7B:
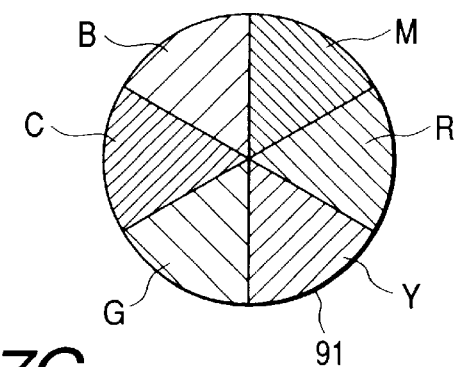
Figure 7C:
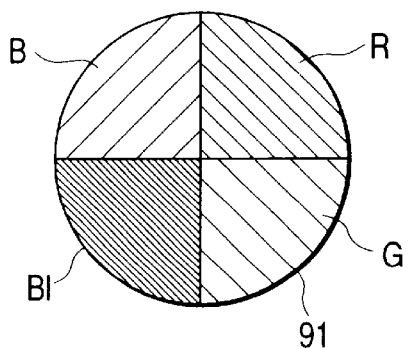

The rotary color filter 91 to be used does not have to be one adapting only the primary colors of R, B, and G as illustrated in FIG. 6. For example, the filter may be one incorporating white (W, i.e., without a filter) in addition to the primary colors of R, B, and G, as illustrated in FIG. 7A, or one incorporating yellow, cyan, and magenta (Y, C, M) in addition to the primary colors, as illustrated in FIG. 7B, or one incorporating black (Bl, i.e., a shield) in addition to the primary colors, as illustrated in FIG. 7C. In these cases, the display panel 5 is also controlled to display color images corresponding to the switchable colors of each rotary filter 91 in the field sequential switching manner.

For the field sequential display switching of the color images as in the present embodiment, the display panel 5 is preferably one selected from a liquid crystal display panel using the TN liquid crystal sealed between silicon substrates, a liquid crystal panel using the ferroelectric liquid crystal, and panels capable of quickly being driven like a mirror panel to drive a micromirror array. With use of the mirror panel, the polarizers 3, 6 do not have to be used.

Third Embodiment

Figure 8:
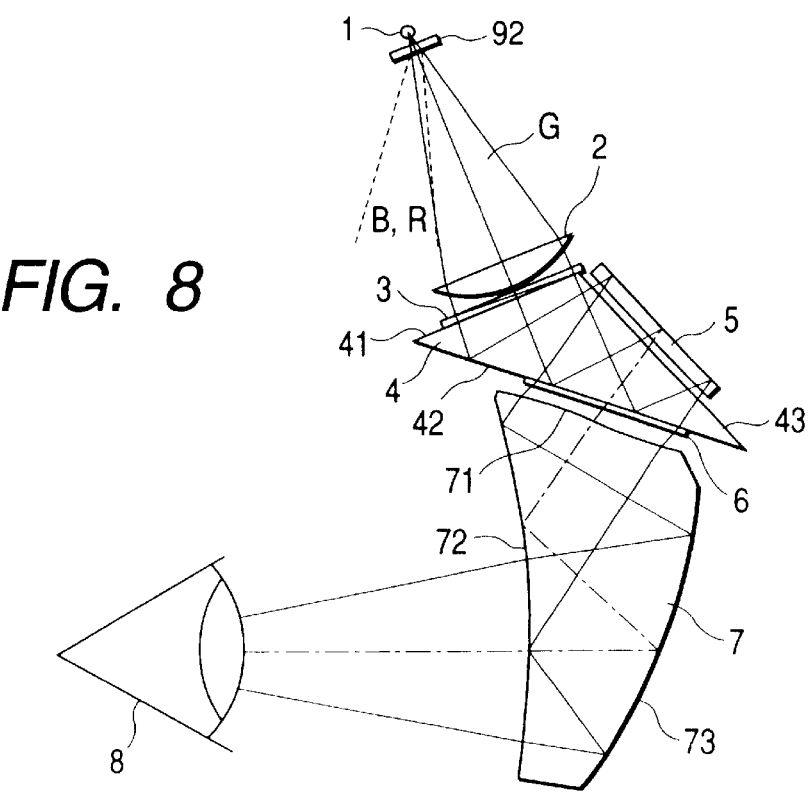
FIG. 8 is a structural diagram to show the main part of a head-mounted display as a third embodiment of the present invention.
Figure 9:
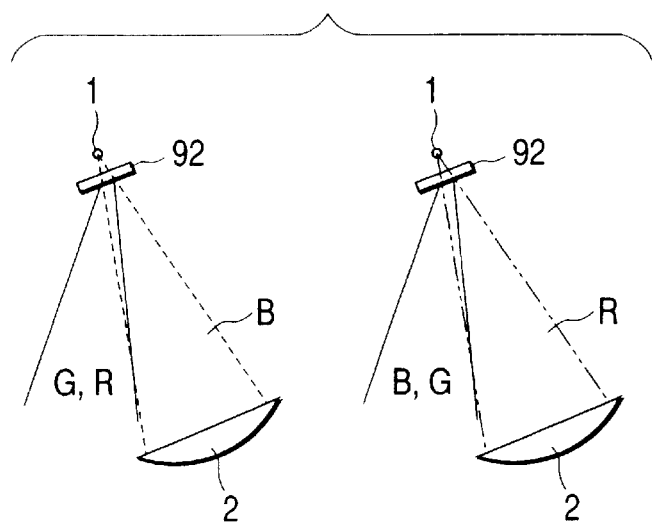
FIG. 9 is an explanatory diagram to illustrate a color filter in the head-mounted display of the third embodiment.

FIG. 8 shows a head-mounted display (image display apparatus) as a third embodiment of the present invention. The basic structure of the head-mounted display of the present embodiment is substantially the same as that in the first embodiment and common components are denoted by the same reference symbols as those in the first embodiment.

In the present embodiment, the light source 1 is a white light source, a color filter (color switching means) 92 capable of control to select its transmission directions of transmitted light for the respective color components is disposed between the light source 1 and the illumination prism 4, and the apparatus is constructed to time-sequentially switch the colors of the illumination light incident through the lens 2 and the illumination prism 4 into the display panel 5. Further, the apparatus is constructed in structure capable of presenting display of a full-color image by the control (field sequential control) to time-sequentially switch the display of the display panel 5 among the color images corresponding to the colors of the illumination light in synchronism with the switching of the illumination light.

Since the field sequential switching control is carried out among the colors of the illumination light entering the display panel 5 and among the color images displayed on the panel 5, this configuration permits all the pixels of the display panel 5 to be used for display of image information concerning one color at a certain time and also permits a high-definition image to be formed without pixel deviation among the colors.

The color filter used in the present embodiment can be realized, for example, by constructing a diffraction optical element with a diffraction pattern sandwiched (or stacked) between layers of an anisotropic material of liquid crystal or the like and electrically controlling directions of liquid crystal molecules (or alignment directions) to switch between a diffraction-generating state and a non-diffraction-generating state.

Fourth Embodiment

Figure 10:
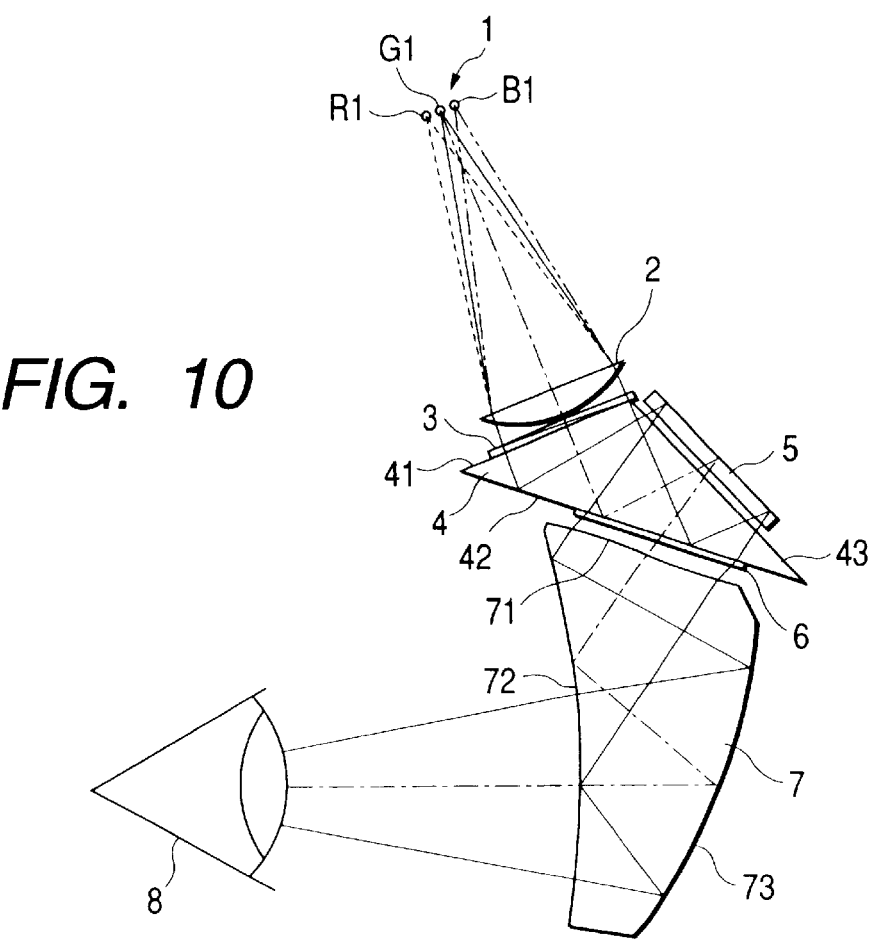
FIG. 10 is a structural diagram to show the main part of a head-mounted display as a fourth embodiment of the present invention.

FIG. 10 shows a head-mounted display (image display apparatus) as a fourth embodiment of the present invention.

The basic structure of the head-mounted display of the present embodiment is substantially the same as that in the first embodiment and common components are denoted by the same reference symbols as those in the first embodiment.

Figure 11:
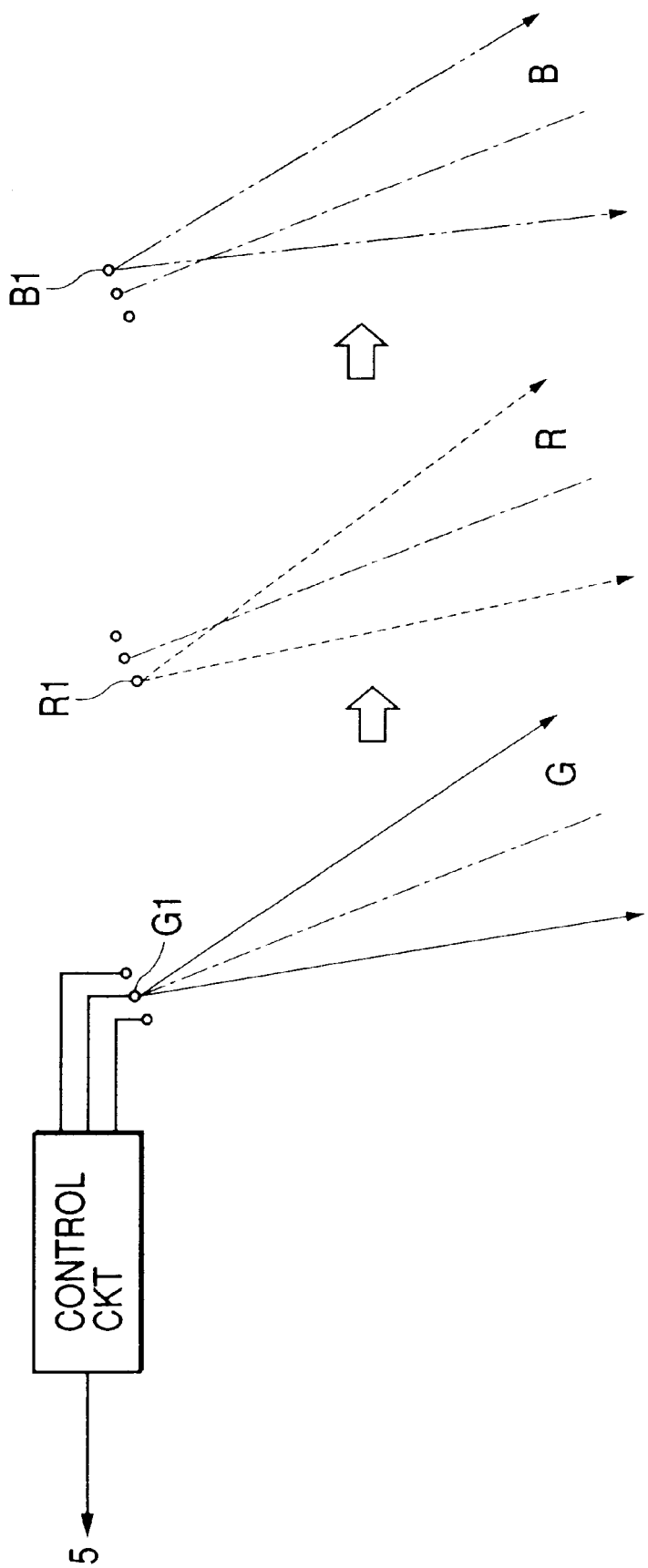
FIG. 11 is an explanatory diagram to illustrate switching of illumination light in the head-mounted display of the fourth embodiment.

In the present embodiment, the light source 1 comprises three color light sources R1, G1, B1 of R, G, and B, a light source to be lighted up is time-sequentially switched among these color light sources, as illustrated in FIG. 11, thereby time-sequentially switching the colors of the illumination light incident through the illumination prism 4 into the display panel 5, and the apparatus is constructed in structure capable of presenting display of a full-color image by being provided with a control circuit to control the display panel 5 so as to display either of the color images corresponding to the colors of the illumination light in synchronism with the switching of lighting among these color light sources.

Since the field sequential switching control is carried out among the colors of the illumination light entering the display panel 5 and among the color images displayed on the panel 5 as described above, this configuration permits all the pixels of the display panel 5 to be used for one color at a certain time and permits a high-definition image to be formed without pixel deviation among the colors.

Fifth Embodiment

Figure 12:
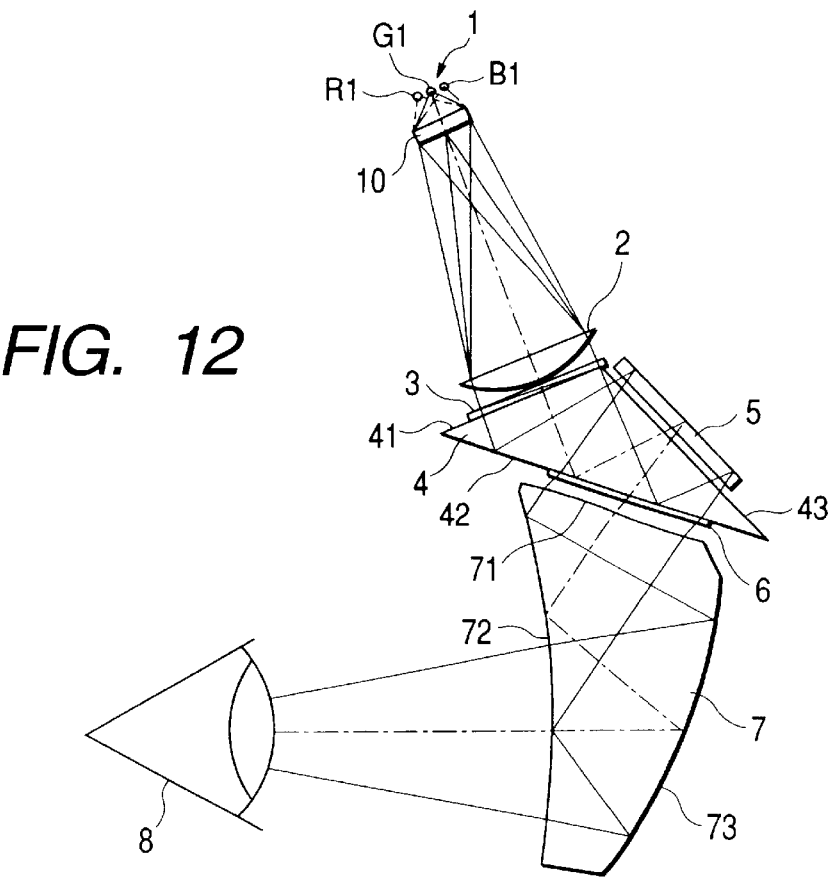
FIG. 12 is a structural diagram to show the main part of a head-mounted display as a fifth embodiment of the present invention.

FIG. 12 shows a head-mounted display (image display apparatus) as a fifth embodiment of the present invention. The basic structure of the head-mounted display of the present embodiment is substantially the same as that in the fourth embodiment and common components are denoted by the same reference symbols as those in the fourth embodiment.

In the present embodiment, the illumination system is constructed in such structure that a diffuser (secondary light source element) 10 is disposed in the vicinity of the light source 1 (in the optical path of the illumination light) and that illumination light from a secondary light source formed on a diffusing surface of this diffuser 10 is condensed by the lens 2 to illuminate the display panel 5.

This structure widens the range of the image light reaching the observer's eye and makes the display easier to view, as compared with the structure in which the illumination light from a point light source is made incident to the display panel 5 without passing through the diffuser 10.

Sixth Embodiment

Figure 13:
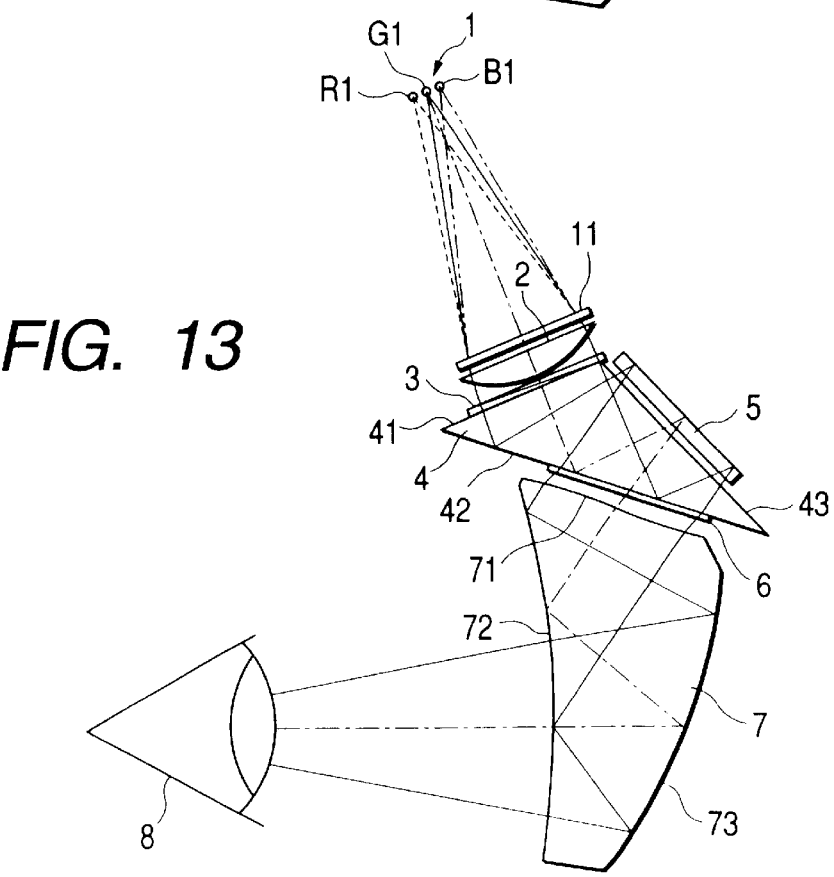
FIG. 13 is a structural diagram to show the main part of a head-mounted display as a sixth embodiment of the present invention.

FIG. 13 shows a head-mounted display (image display apparatus) as a sixth embodiment of the present invention. The basic structure of the head-mounted display of the present embodiment is substantially the same as that in the fourth embodiment and common components are denoted by the same reference symbols as those in the fourth embodiment.

In the present embodiment the illumination system is constructed in such structure that a diffuser 11 is disposed in the vicinity of the light-source-side surface of lens 2 (in the optical path of the illumination light) and that illumination light from a secondary light source formed on a diffusing surface of this diffuser 11 is condensed by the lens 2 to illuminate the display panel 5.

This structure widens the range of the image light reaching the observer's eye and makes the display easier to view, as compared with the structure in which the illumination light from a point light source is made incident to the display panel 5 without passing through the diffuser 11.

Figure 14:
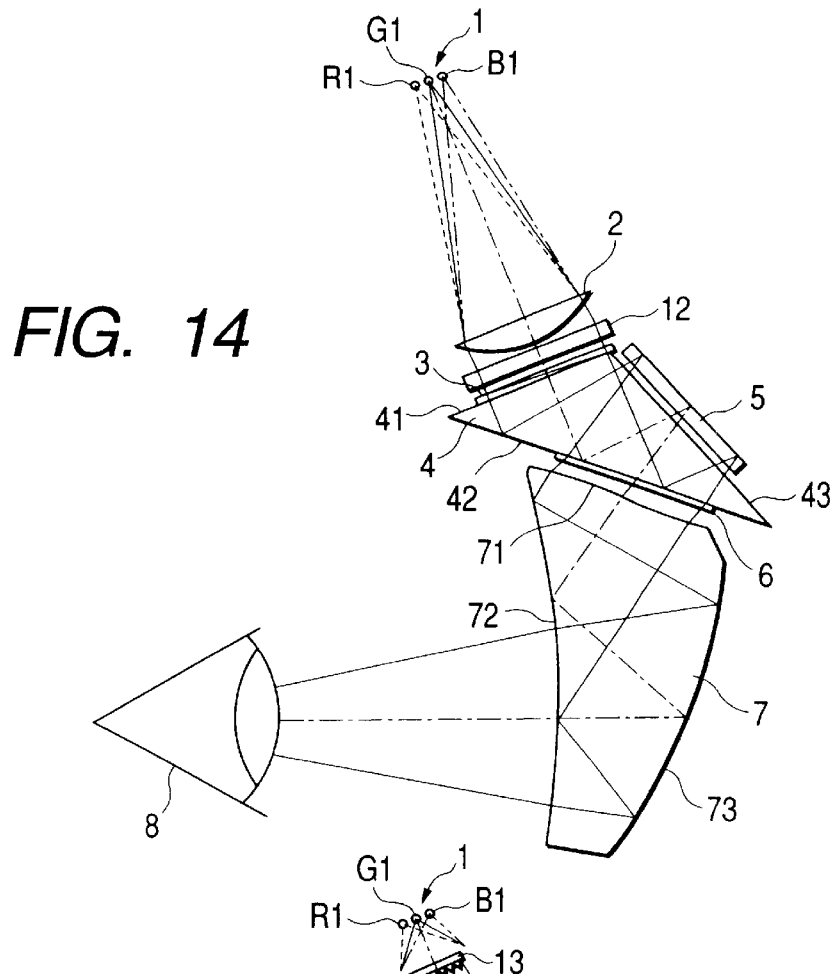
FIG. 14 is a modification example of the head-mounted display of the sixth embodiment.

As illustrated in FIG. 14, the apparatus may also be constructed in such structure that the diffuser 12 is disposed in the vicinity of the illumination-prism-side surface of the lens 2 and between the lens 2 and the first polarizer 3 (in the optical path of the illumination light) and that the display panel 5 is illuminated by the illumination light from the secondary light source formed on the diffusing surface of the diffuser 12.

However, since there is a possibility that light except for the light guided to the eye by the observation system is also incident into the illumination prism 4 by the provision of the diffuser 12 in the vicinity of the illumination entrance surface of the illumination prism 4, surfaces including the side surfaces (not illustrated) of the illumination prism 4 not used for the illumination system are made so that diffusing surfaces are first formed and then coated with a black paint having a light absorbing property or the like, whereby the unnecessary light can be prevented from entering the eye 8.

Seventh Embodiment

Figure 15:
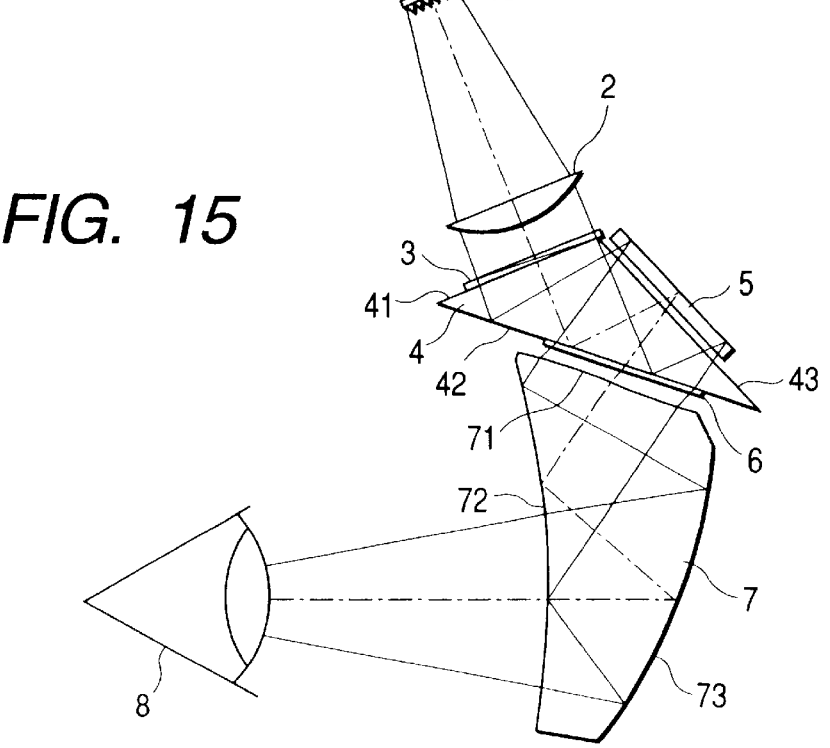
FIG. 15 is a structural diagram to show the main part of a head-mounted display as a seventh embodiment of the present invention.

FIG. 15 shows a head-mounted display (image display apparatus) as a seventh embodiment of the present invention. The basic structure of the head-mounted display of the present embodiment is substantially the same as that in the fourth embodiment and common components are denoted by the same reference symbols as those in the fourth embodiment.

In the present embodiment, the illumination system is constructed in such structure that a lens array sheet 13 consisting of an array of microlenses is disposed in the vicinity of the light source 1 (color light sources R1, G1, B1) (in the optical path of the illumination light) and that illumination light from secondary light sources formed as points of convergence by the respective lenses of the lens array sheet 13 is condensed by the lens 2 to illuminate the display panel 5.

This structure widens the range of the image light reaching the observer's eye and makes the display easier to view, as compared with the structure in which the illumination light from one point light source is made incident to the display panel 5 without passing through the lens array 13.

Eighth Embodiment

Figure 16:
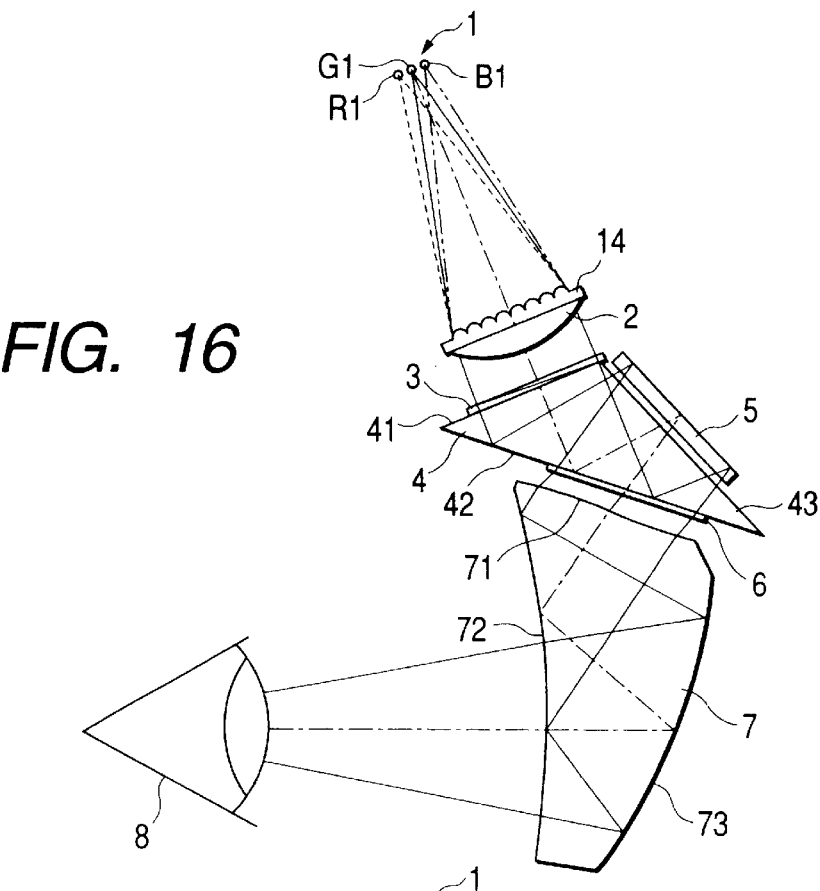
FIG. 16 is a structural diagram to show the main part of a head-mounted display as an eighth embodiment of the present invention.

FIG. 16 shows a head-mounted display (image display apparatus) as an eighth embodiment of the present invention. The basic structure of the head-mounted display of the present embodiment is substantially the same as that in the fourth embodiment and common components are denoted by the same reference symbols as those in the fourth embodiment.

In the present embodiment, the illumination system is constructed in such structure that the lens array sheet 14 consisting of an array of microlenses is disposed in the vicinity of the light-source (color light sources R1, G1, B1)-side surface of the lens 2 (in the optical path of the illumination light) and that illumination light from secondary light sources formed as points of convergence by the respective lenses of the lens array sheet 14 is condensed by the lens 2 to illuminate the display panel 5.

This structure widens the range of the image light reaching the observer's eye and makes the display easier to view, as compared with the structure in which the illumination light from one point light source is made incident into the display panel 5 without passing through the lens array 14.

Figure 17:
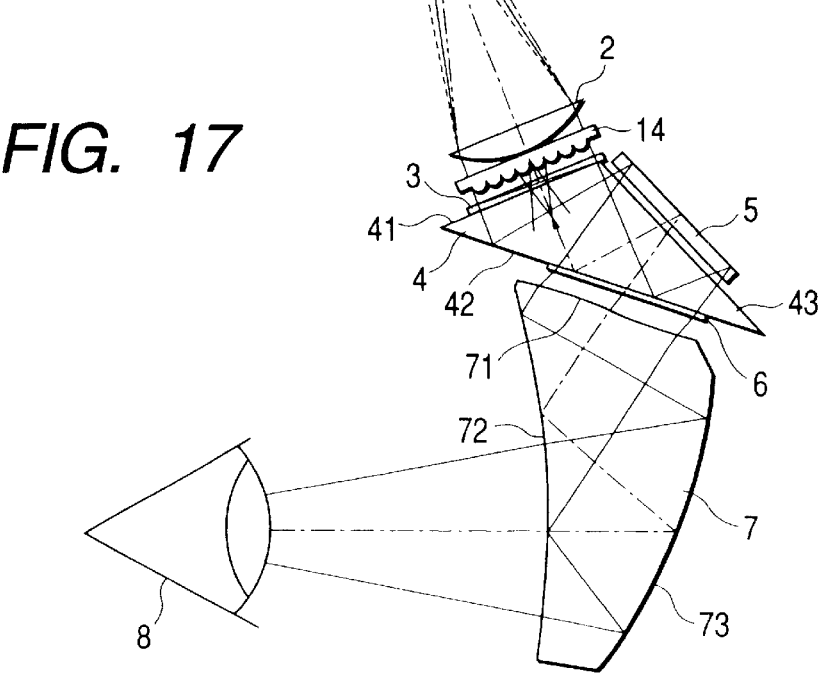
FIG. 17 is a modification example of the head-mounted display of the eighth embodiment.

The lens array sheet 14 may also be interposed between the lens 2 and the first polarizer 3, as illustrated in FIG. 17.

Numerical Examples

Specific numerical data of optical systems applicable to the first to eighth embodiments described above will be presented below.

Figure 18:
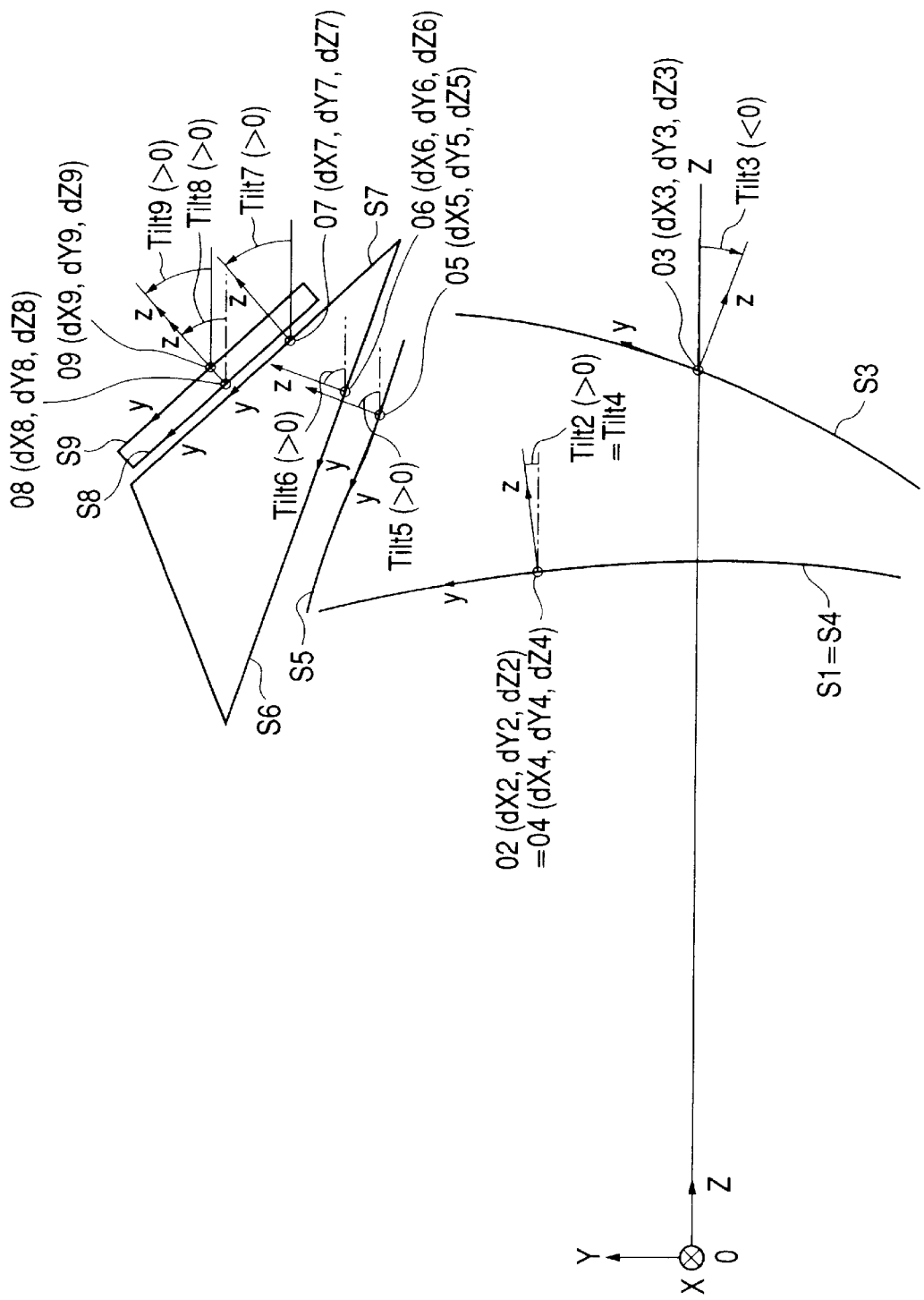
FIG. 18 is an explanatory diagram to illustrate an absolute coordinate system and local coordinate systems.
Figure 19:
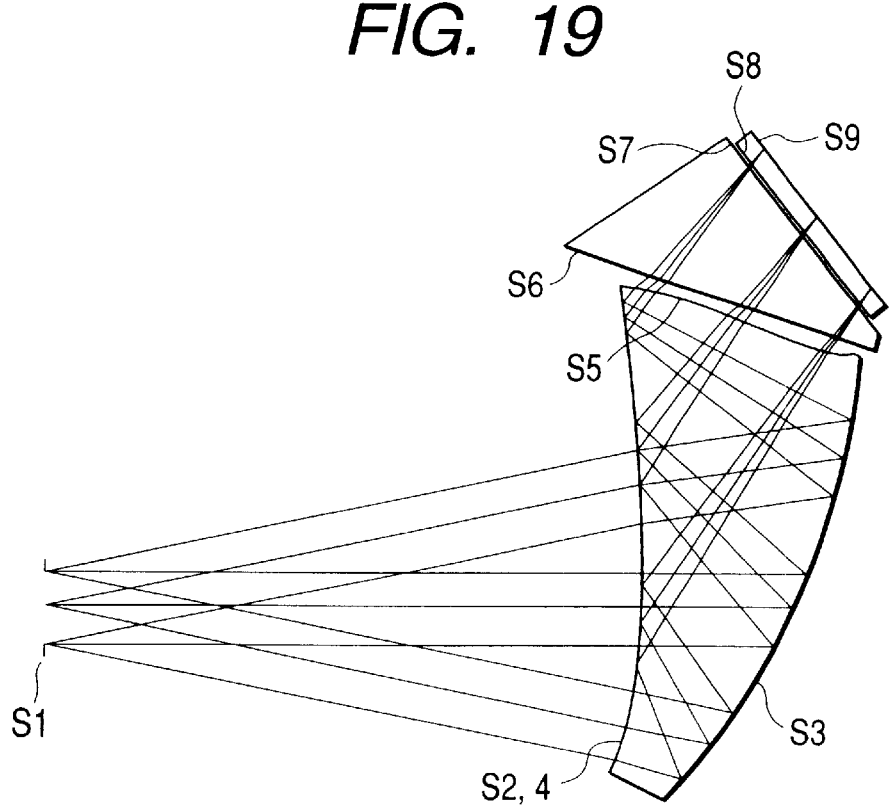
FIG. 19 is a schematic structural diagram to illustrate the optical systems in Numerical Example 1 of the present invention.
Figure 20:
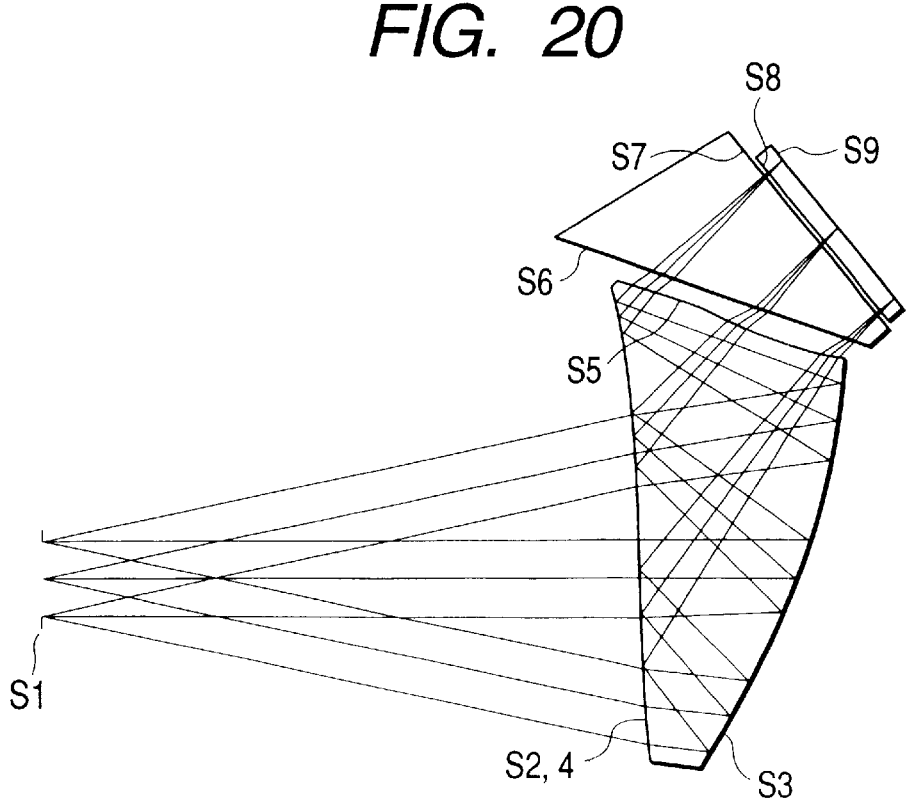
FIG. 20 is a schematic structural diagram to illustrate the optical systems in Numerical Example 2 of the present invention.
Figure 21:
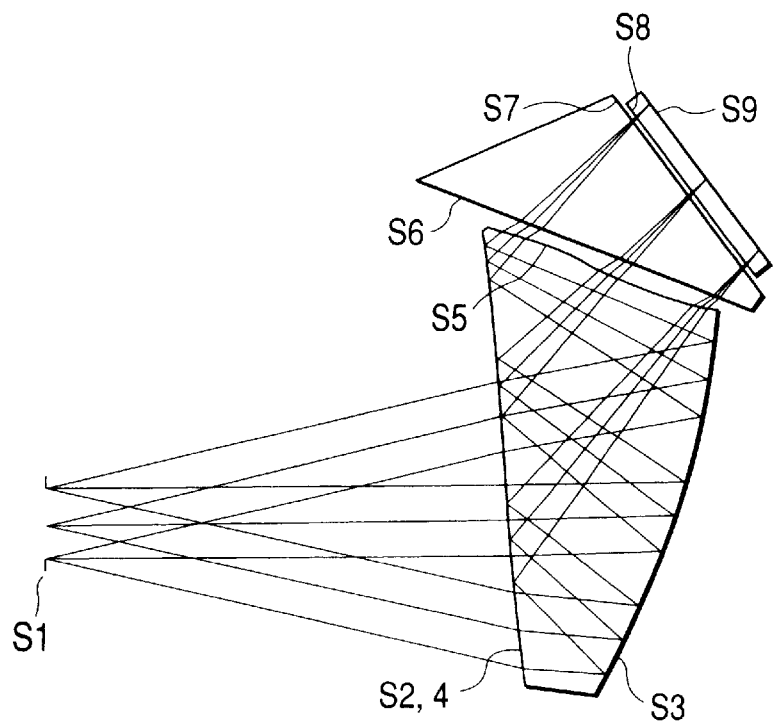
FIG. 21 is a schematic structural diagram to illustrate the optical systems in Numerical Example 3 of the present invention.
Figure 22:
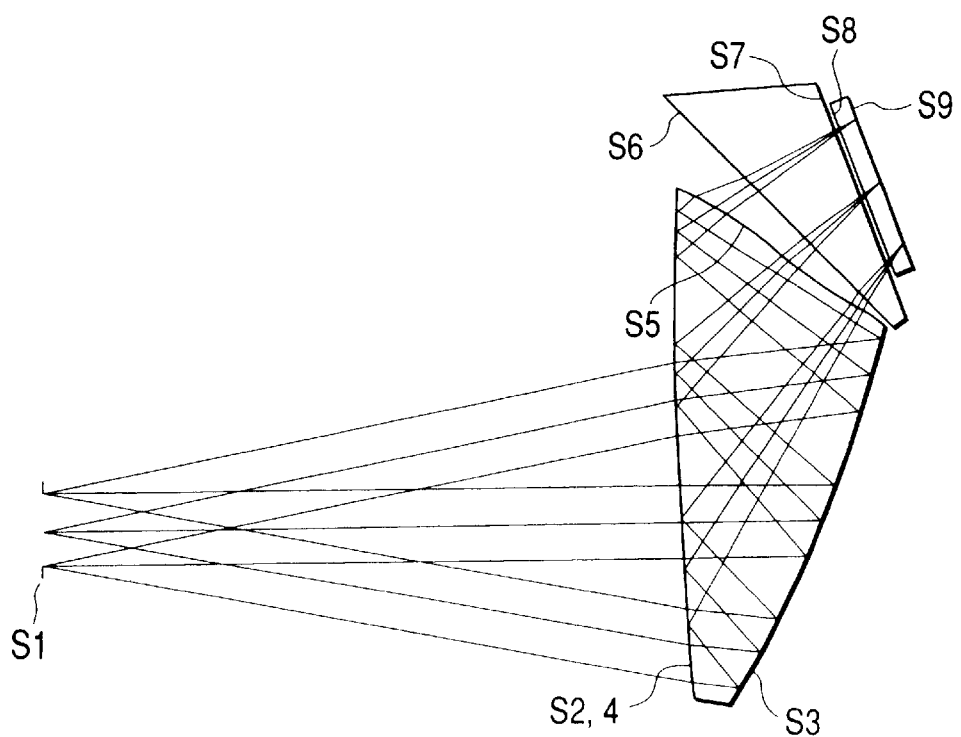
FIG. 22 is a schematic structural diagram to illustrate the optical systems in Numerical Example 4 of the present invention.
Figure 23:
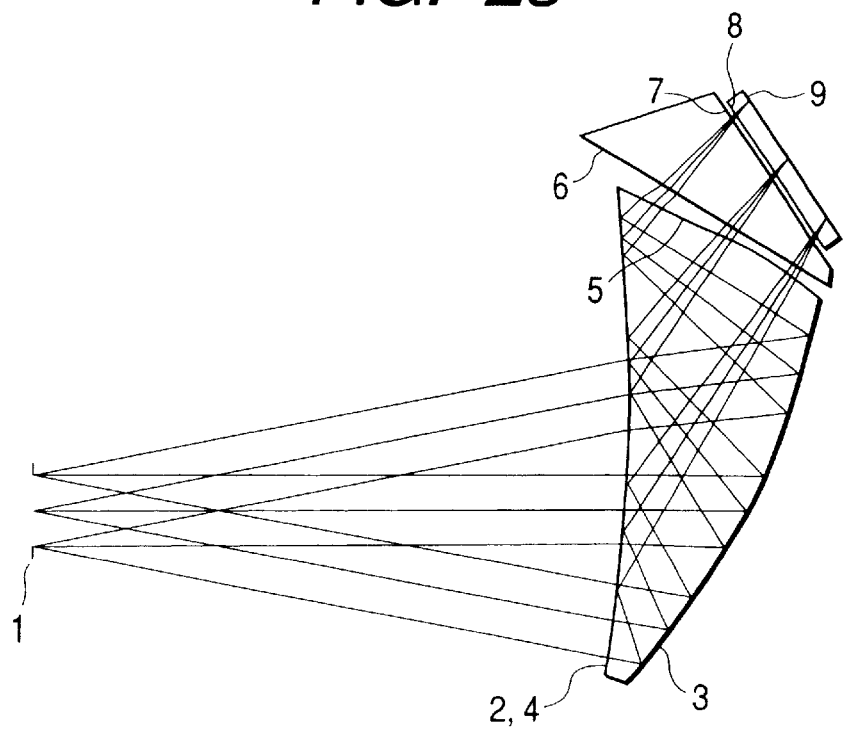
FIG. 23 is a schematic structural diagram to illustrate the optical systems in Numerical Example 5 of the present invention.

In these examples, since the optical systems are comprised of decentered surfaces, an absolute coordinate system (X, Y, Z) and local coordinate systems (x, y, z) are set in order to express the shapes of the optical systems. FIG. 18 is an explanatory diagram to illustrate the absolute coordinate system and local coordinate systems. This will be described below.

The origin of the absolute coordinate system is set at the center O of the desired pupil position of the observer and the Z-axis is located along a straight line passing the point O and being normal to the pupil plane (i.e., a direction to view the center of the image) and on a symmetry plane of the optical system (i.e., on the plane of the drawing).

The Y-axis is a straight line passing the origin O and making the angle of 90° counterclockwise relative to the Z-axis on the symmetry plane. The X-axis is a straight line passing the origin O and being perpendicular to the Y- and Z-axes.

A location of each optical action surface is expressed by absolute coordinates (dXi, dYi, dZi) on the basis of the origin Oi of a local coordinate system, for each surface Si. The shape of each optical action surface is expressed as a function based on local coordinates.

An angle Tilt i between the Z-axis of the absolute coordinate system and the z-axis of each local coordinate system is positive when it is a counterclockwise angle to the z-axis of the local coordinate system, as illustrated in FIG. 18.

The shape of each optical action surface in Numerical Examples 1, 4, and 5 is one having an aspherical surface expressed by a shape function indicating a quadratic surface, plus Zernike polynomials, which is represented by the function below:

$$z = \frac{c(x^2 + y^2)}{1 + \{1 - c^2(x^2 + y^2)\}^{1/2}} + c4(x^2 - y^2) + c5(-1 + 2x^2 + 2y^2) + \\ c9(-2y + 3x^2y + 3y^3) + c10(3x^2y - y^3) + \\ c11(x^4 - 6x^2y^2 + y^4) + c12(-3x^2 + 4x^4 + 3y^2 - 4y^4) + \\ c13(1 - 6x^2 + 6x^4 - 6y^2 + 12x^2y^2 + 6y^4) + \\ c19(3y - 12x^2y + 10x^4y - 12y^3 + 20x^2y^3 + 10y^5) + \\ c20(-12x^2y + 15x^4y + 4y^3 + 10x^2y^3 - 5y^5) + \\ c21(5x^4y - 10x^2y^3 + y^5) + c22(x^6 - 15x^4y^2 + 15x^2y^4 - y^6) + \\ c23(6x^6 - 30x^4y^2 - 30x^2y^4 + 6y^6 - 5x^4 + 30x^2y^2 - 5y^4) + \\ c24(15x^6 + 15x^4y^2 - 15x^2y^4 - 15y^6 - 20x^4 + 20y^4 + \\ 6x^2 - 6y^2) + c25(20x^6 + 60x^4y^2 + 60x^2y^4 + \\ 20y^6 - 30x^4 - 60x^2y^2 - 30y^4 + 12x^2 + 12y^2 - 1)$$

In this equation, c is a curvature of each surface and the curvature c is given by c=1/r where r is a basic radius of curvature of each surface. Further, cj represents aspherical coefficients of the Zernike polynomials in each surface.

Since each optical action surface is symmetric with respect to the YZ plane, the above function is presented by eliminating the asymmetric terms in the X-axis direction.

The shape of each optical action surface in Numerical Examples 2 and 3 is one having an aspherical surface expressed by a shape function indicating a quadratic surface, plus power polynomials, which is expressed by the function below:

$$z = \frac{c(x^2 + y^2)}{1 + \{1 - c^2(x^2 + y^2)\}^{1/2} + c'3y + c'4x^2 + c'6y^2 + c'8x^2y +} $$
$$c'10y^3 + c'11x^4 + c'13x^2y^2 + c'15y^4 + c'17x^4y +$$
$$c'19x^2y^3 + c'21y^5 + c'22x^6 + c'24x^4y^2 + c'26x^2y^4 + c'28y^6$$

In this equation, c is a curvature of each surface and the curvature c is given by c=1/r where r is a basic radius of curvature of each optical action surface. Further, c'j represents aspherical coefficients of the power polynomials in each surface.

Since each optical action surface is symmetric with respect to the YZ plane, the above function is presented by eliminating the asymmetric terms in the x-axis direction.

The lens data is defined for the optical systems in which the first surface is at the origin O of the absolute coordinate system, the image display surface is the image plane, and rays are traced backward against actual light traveling.

<Numerical Example 1>
Angle of view in the x-direction = ± 9.0°,
Angle of view in the y-direction = ±12.0°
Refractive index of prism (second to fifth surfaces) n = 1.571

| S1 | r: ∞ | | n: 1.0000 | |
|---|---|---|---|---|
| S2 | dY 7.83 | dZ 31.03 | Tilt 3.50 | |
| | r: −100.433 | | | |
| | c4: −3.307e−03 | c5: −1.165e−03 | c9: −6.272e−05 | |
| | c10: −7.142e−05 | c11: 3.936e−07 | c12: 1.640e−06 | |
| | c13: −1.848e−06 | c19: −2.900e−08 | c20: 1.268e−08 | |
| | c21: −2.956e−07 | c22: 3.968e−09 | c23: −2.127e−09 | |
| | c24: 1.666e−09 | c25: −8.306e−10 | | |
| S3 | dY 1.27 | dZ 39.72 | Tilt −21.50 | |
| | r: −39.332 | | | |
| | c4: −1.389e−03 | c5: 1.135e−04 | c9: −8.011e−06 | |
| | c10: −5.002e−06 | c11: 2.126e−07 | c12: 5.227e−07 | |
| | c13: −4.186e−01 | c19: 2.591e−08 | c20: −2.986e−08 | |
| | c21: −2.274e−06 | c22: −8.657e−10 | c23: −5.791e−10 | |
| | c24: 5.953e−10 | c25: −5.290e−10 | | |
| S4 | dY 7.83 | dZ 31.03 | Tilt 3.50 | |
| | r: −100.433 | | | |
| | c4: −3.307e−03 | c5: −1.165e−03 | c9: −6.272e−05 | |
| | c10: −7.142e−05 | c11: 3.936e−07 | c12: 1.640e−06 | |
| | c13: −1.848e−06 | c19: −2.900e−08 | c20: 1.268e−08 | |
| | c21: −2.956e−07 | c22: 3.968e−09 | c23: −2.127e−09 | |
| | c24: 1.666e−09 | c25: −8.306e−10 | | |
| S5 | dY 14.79 | dZ 38.10 | Tilt 70.53 | |
| | r: 37.866 | | | |
| | c4: 7.662e−03 | c5: 8.422e−04 | c9: −4.588e−04 | |
| | c10: 3.757e−04 | c11: 5.015e−05 | c12: 4.182e−06 | |
| | c13: 1.465e−05 | c19: −2.861e−07 | c20: 2.195e−07 | |
| | c21: −4.250e−06 | c22: −1.699e−07 | c23: −6.247e−08 | |
| | c24: −2.618e−08 | c25: −1.152e−10 | | |
| S6 | dY 15.57 | dZ 38.44 | Tilt 71.34 | |
| | r: ∞ | | n: 1.5163 | |
| S7 | dY 17.46 | dZ 41.39 | Tilt 38.53 | |
| | r: ∞ | | n: 1.0000 | |
| S8 | dY 20.26 | dZ 39.28 | Tilt 38.53 | |
| | r: ∞ | d: 1.10 | n: 1.5230 | |
| S9 | r: ∞ | d: 0.00 | n: 1.0000 | |

<Numerical Example 2>
Angle of view in the x-direction = ±10.1°,
Angle of view in the y-direction = ±13.5°
Refractive index of prism (second to fifth surfaces) n = 1.570

| S1 | r: ∞ | | n: 1.0000 |
|---|---|---|---|
| S2 | dY −17.45 | dZ 26.29 | Tilt 7.50 |
| | c'3: 0.000e+00 | c'4: −6.554e−03 | c'6: 6.146e−04 |
| | c'8: 3.428e−04 | c'10: 3.711e−05 | c'11: −1.916e−05 |
| | c'13: −1.424e−05 | c'15: 5.907e−07 | c'17: 4.102e−06 |
| | c'19: −4.574e−07 | c'21: 5.724e−09 | c'22: −1.451e−07 |
| | c'24: −2.256e−07 | c'26: 1.400e−08 | c'28: −1.535e−09 |
| S3 | dY 0.59 | dZ 33.25 | Tilt −17.84 |
| | c'3: 0.000e+00 | c'4: −1.266e−02 | c'6: −9.063e−03 |
| | c'8: −1.033e−04 | c'10: −1.181e−04 | c'11: −7.053e−06 |
| | c'13: −2.091e−06 | c'15: 7.684e−07 | c'17: −2.789e−07 |
| | c'19: −6.405e−08 | c'21: 9.712e−09 | c'22: −1.760e−08 |
| | c'24: 1.681e−09 | c'26: −1.552e−08 | c'28: −4.260e−09 |
| S4 | dY −17.45 | dZ 26.29 | Tilt 7.50 |
| | c'3: 0.000e+00 | c'4: −6.554e−03 | c'6: 6.146e−04 |
| | c'8: 3.428e−04 | c'10: 3.711e−05 | c'11: −1.976e−05 |
| | c'13: −1.424e−05 | c'15: 5.907e−07 | c'17: 4.102e−06 |
| | c'19: −4.574e−07 | c'21: 5.724e−09 | c'22: −1.451e−07 |
| | c'24: −2.256e−07 | c'26: 1.400e−08 | c'28: −1.535e−09 |
| S5 | dY 12.30 | dZ 32.52 | Tilt 67.32 |
| | c'3: 0.000e+00 | c'4: 9.589e−03 | c'6: 2.574e−02 |
| | c'8: −2.482e−03 | c'10: −4.612e−03 | c'11: −4.076e−04 |
| | c'13: 4.927e−04 | c15: 2.330e−04 | c'17: −6.626e−06 |
| | c'19: −1.358e−05 | c'21: −3.830e−06 | c'22: 0.000e+00 |
| | c'24: 0.000e+00 | c'26: 0.000e+00 | c'28: 0.000e+00 |
| S6 | dY 14.23 | dZ 30.47 | Tilt 68.04 |
| | r: ∞ | | n: 1.5163 |
| S7 | dY 18.53 | dZ 33.20 | Tilt 36.97 |
| | r: ∞ | | n: 1.0000 |
| S8 | dY 18.00 | dZ 33.85 | Tilt 36.97 |
| | r: ∞ | d: 1.10 | n: 1.5230 |
| S9 | r: ∞ | d: 0.00 | n: 1.0000 |

<Numerical Example 3>
Angle of view in the x-direction = ± 9.4°,
Angle of view in the y-direction = ±12.5°
Refractive index of prism (second to fifth surfaces) n = 1.700

| S1 | r: ∞ | | n: 1.0000 |
|---|---|---|---|
| S2 | dY −19.38 | dZ 33.12 | Tilt 7.15 |
| | c'3: 0.000e+00 | c'4: −6.942e−03 | c'6: 1.009e−03 |
| | c'8: 6.503e−06 | c'10: 4.793e−05 | c'11: −2.002e−05 |
| | c'13: 3.170e−06 | c'15: 3.755e−07 | c'17: 5.540e−07 |
| | c'19: −4.015e−07 | c'21: −5.835e−09 | c'22: −3.270e−09 |
| | c'24: −5.314e−08 | c'26: 2.726e−09 | c'28: −1.313e−09 |
| S3 | dY 1.45 | dZ 40.09 | Tilt −18.35 |
| | c'3: 0.000e+00 | c'4: −1.376e−02 | c'6: −1.035e−02 |
| | c'8: −1.134e−04 | c'10: −1.231e−04 | c'11: −1.116e−05 |
| | c'13: −5.784e−06 | c'15: 1.765e−06 | c'17: −5.334e−08 |
| | c'19: −1.285e−08 | c'21: −1.359e−07 | c'22: 7.385e−10 |
| | c'24: −1.387e−08 | c'26: −7.734e−09 | c'28: −6.297e−09 |
| S4 | dY −19.38 | dZ 33.12 | Tilt 7.15 |
| | c'3: 0.000e+00 | c'4: −6.942e−03 | c'6: 1.009e−03 |
| | c'8: 6.503e−06 | c'10: 4.793e−05 | c'11: −2.002e−05 |
| | c'13: 3.170e−06 | c'15: 3.755e−07 | c'17: 5.540e−07 |
| | c'19: −4.015e−07 | c'21: −5.835e−09 | c'22: −3.270e−09 |
| | c'24: −5.314e−08 | c'26: 2.726e−09 | c'28: −1.313e−09 |
| S5 | dY 11.92 | dZ 43.69 | Tilt −85.09 |
| | c'3: 0.000e+00 | c'4: 3.272e−02 | c'5: 5.334e−02 |
| | c'8: −6.533e−03 | c'10: 3.290e−03 | c'11: −1.087e−04 |
| | c'13: 7.729e−04 | c'15: −6.812e−04 | c'17: 3.580e−05 |
| | c'19: −2.551e−05 | c'21: 2.306e−05 | C'22: 0.000e+00 |
| | c'24: 0.000e+00 | c'26: 0.000e+00 | c'28: 0.000e+00 |
| S6 | dY 14.27 | dZ 38.69 | Tilt 70.52 |
| | r ∞ | | n: 1.5163 |
| S7 | dY 17.94 | dZ 41.06 | Tilt 38.87 |
| | r: ∞ | | n: 1.0000 |
| S8 | dY 18.53 | dZ 40.84 | Tilt 38.87 |
| | r: ∞ | d: 1.10 | n: 1.5230 |
| S9 | r: ∞ | d: 0.00 | n: 1.0000 |

<Numerical Example 4>
Angle of view in the x-direction = ±15.0°,
Angle of view in the y-direction = ±11.2°
Refractive index of prism (second to fifth surfaces) n = 1.570

| S1 | r: ∞ | | n: 1.0000 |
|---|---|---|---|
| S2 | dY −23.69 | dZ 36.95 | Tilt 10.49 |
| | r: 255.629 | | |
| | c4: 6.085e−04 | c5: −4.977e−04 | c9: 8.657e−06 |
| | c10: −3.669e−05 | c11: 3.013e−07 | c12: −1.910e−07 |
| | c13: −5.180e−08 | c19: −5.840e−10 | c20: −9.577e−10 |
| | c21: −1.450e−9 | c22: −9.686e−11 | c23: −2.075e−11 |
| | c24: 1.196e−11 | c25: 1.758e−11 | |

-continued

| | | | |
|---|---|---|---|
| S3 | dY −0.31 | dZ 41.09 | Tilt −22.91 |
| | r: −71.945 | | |
| | c4: −2.459e−03 | c5: −1.110e−03 | c9: −5.627e−05 |
| | c10: 9.527e−07 | c11: −7.886e−08 | c12: −5.893e−07 |
| | c13: 1.109e−07 | c19: 8.032e−09 | c20: −1.540e−08 |
| | c21: 1.105e−08 | c22: −6.381e−11 | c23: 1.914e−10 |
| | c24: 5.234e−11 | c25: 9.073e−11 | |
| S4 | dY −23.69 | dZ 36.95 | Tilt 10.49 |
| | r: 255.629 | | |
| | c4: 6.085e−04 | c5: −4.977e−04 | c9: 8.657e−06 |
| | c10: −3.669e−05 | c11: 3.013e−07 | c12: −1.910e−07 |
| | c13: −5.180e−08 | c19: −5.840e−10 | c20: −9.577e−10 |
| | c21: −1.450e−09 | c22: −9.686e−11 | c23: −2.075e−11 |
| | c24: 1.196e−11 | c25: −1.758e−11 | |
| S5 | dY 15.97 | dZ 37.39 | Tilt 52.17 |
| | r: −361.524 | | |
| | c4: 1.211e−03 | c5: −3.804e−03 | c9: −8.203e−04 |
| | c10: 7.935e−04 | c11: −3.264e−05 | c12: 1.544e−05 |
| | c13: −1.167e−05 | c19: 0.000e+00 | c20: 0.000e+00 |
| | c21: 0.000e+00 | c22: 0.000e+00 | c23: 0.000e+00 |
| | c24: 0.000e+00 | c25: 0.000e+00 | |
| S6 | dY 19.02 | dZ 36.97 | Tilt 44.16 |
| | r: ∞ | n: 1.5163 | |
| S7 | dY 21.58 | dZ 41.87 | Tilt 20.66 |
| | r: ∞ | n: 1.0000 | |
| S8 | dY 18.16 | dZ 43.37 | Tilt 20.66 |
| | r: ∞ | d: 1.10 | n: 1.5230 |
| S9 | r ∞ | d: 0.00 | n: 1.0000 |

<Numerical Example 5>
Angle of view in the x-direction = ±15.0°,
Angle of view in the y-direction = ±11.2°
Refractive index of prism (second to fifth surfaces) n = 1.571

| | | | |
|---|---|---|---|
| S1 | r: ∞ | n: 1.0000 | |
| S2 | dY −66.17 | dZ 24.36 | Tilt −6.96 |
| | r: −457.224 | | |
| | c4: −9.305e−04 | c5: −3.229e−04 | c9: 3.505e−07 |
| | c10: −7.323e−06 | c11: 9.125e−08 | c12: −3.783e−09 |
| | c13: −1.514e−09 | c19: −4.593e−11 | c20: −6.705e−12 |
| | c21: 8.148e−10 | c22: −3.195e−12 | c23: −1.139e−12 |
| | c24: 7.100e−13 | c25: −6.199e−13 | |
| S3 | dY −1.87 | dZ 36.84 | Tilt −29.99 |
| | r: −51.716 | | |
| | c4: −1.851e−03 | c5: −2.129e−03 | c9: −9.909e−06 |
| | c10: −4.449e−06 | c11: 3.818e−08 | c12: −3.436e−07 |
| | c13: −3.451e−07 | c19: −1.065e−08 | c20: −1.655e−09 |
| | c21: −1.859e−09 | c22: −2.324e−10 | c23: 4.922e−11 |
| | c24: −2.111e−10 | c25: −4.289e−11 | |
| S4 | dY −66.17 | dZ 24.36 | Tilt −6.96 |
| | r: −457.224 | | |
| | c4: −9.305e−04 | c5: −3.229e−04 | c9: 3.505e−07 |
| | c10: −7.323e−06 | c11: 9.125e−08 | c12: −3.783e−09 |
| | c13: −1.514e−09 | c19: −4.593e−11 | c20: −6.705e−12 |
| | c21: 8.148e−10 | c22: −3.195e−12 | c23: −1.139e−12 |
| | c24: 7.100e−13 | c25: −6.199e−13 | |
| S5 | dY 10.09 | dZ 42.84 | Tilt 40.06 |
| | r: −120.292 | | |
| | c4: 2.142e−02 | c5: −5.012e−03 | c9: −5.723e−04 |
| | c10: −1.025e−03 | c11: −3.201e−05 | c12: −1.789e−06 |
| | c13: 3.509e−05 | c19: −4.617e−07 | c20: 2.780e−07 |
| | c21: 2.896e−07 | c22: 0.000e+00 | c23: 0.000e+00 |
| | c24: 0.000e+00 | c25: 0.000e+00 | |
| S6 | dY 15.39 | dZ 36.66 | Tilt 58.96 |
| | r: | n: 1.5163 | |
| S7 | dY 18.04 | dZ 38.70 | Tilt 34.91 |
| | r: ∞ | | n: 1.0000 |
| S8 | r: ∞ | d: 1.10 | n: 1.5230 |
| S9 | r: ∞ | d: 0.00 | n: 1.0000 |

FIGS. 19 to 23 are optical path diagrams of the optical systems in above Numerical Examples 1 to 5, respectively. These diagrams are optical path diagrams obtained by backward tracing of optical paths from the eye side, in which numerals represent the numbers of the optical action surfaces described in the numerical examples.

In Numerical Examples 1 to 3 angles of incidence to the display panel 5 are arranged to be approximately telecentric.

Figure 24:
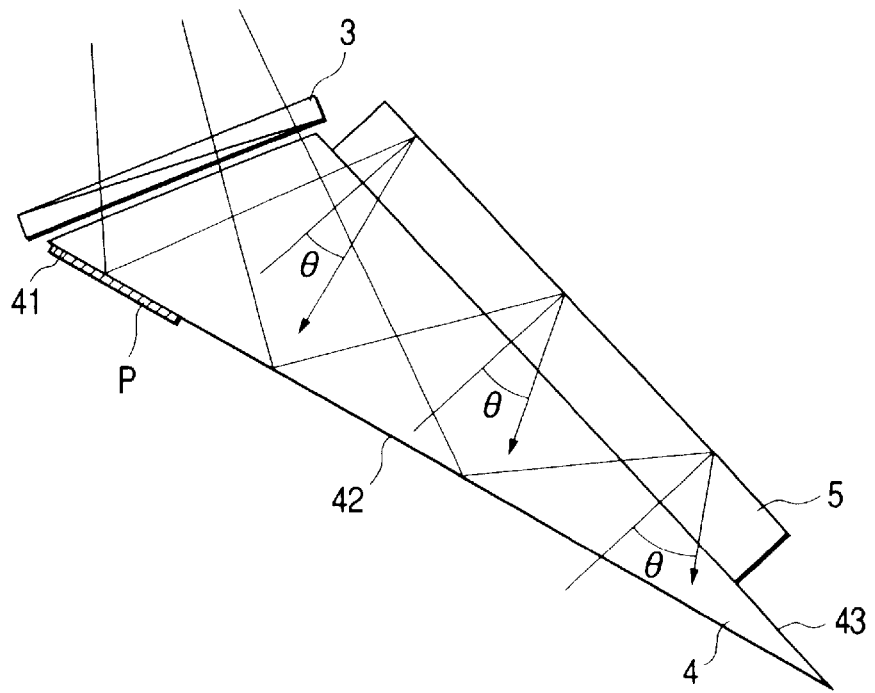
FIG. 24 is a diagram to explain angles of the image light emerging from the display panel in each embodiment.

In Numerical Examples 4, 5 on the other hand, as illustrated in FIG. 24, angles θ between beam centers of image light emerging from the panel 5 and normal to the surface of panel 5 are arranged to increase from the far side to the near side in distance on the display panel 5 from the prism lens 7.

This makes it feasible to shorten the optical paths of incidence of illumination light to the illumination prism 4 and thus to compactify the illumination system and the entire optical system.

Further, as illustrated in FIG. 24, a reflective mirror (reflecting film) or the like is laid on the part of the range P not satisfying the total reflection condition in the second surface 42 of the illumination prism 4, so as to act as a reflective surface. This can expand the range of incidence angles of the illumination light reflected on the second surface 42 of the illumination prism 4.

Ninth Embodiment

Figure 25:
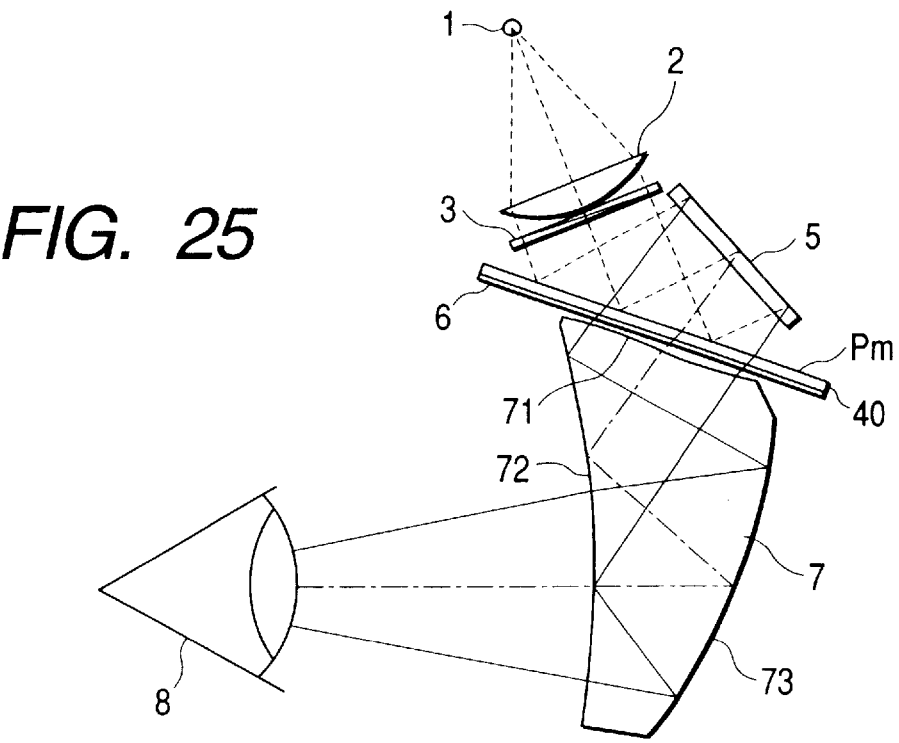
FIG. 25 is a structural diagram to show the main part of a head-mounted display as a ninth embodiment of the present invention.

The first to eighth embodiments were described as examples using the illumination prism 4 as a light guide means, but the light guide means may be replaced by a reflective/transmissive sheet 40 having a polarization separating surface pm to reflect the light having the first polarization direction but transmit the light having the second polarization direction perpendicular to the first polarization direction, as illustrated in FIG. 25.

In this case, an aperture ap is formed between the reflective/transmissive sheet 40 and the display panel 5 and the illumination light is guided through this aperture ap to the reflective/transmissive sheet 40.

In each of the above embodiments the lens 2 may be replaced by a Fresnel lens, a diffracting lens element, or the like.

According to the image display apparatus in each of the embodiments described above, the light guide element is provided with the reflective/transmissive surface to reflect the incident illumination light toward the reflective image display element and transmit the image light from the reflective image display element toward the projection optical element, and thus the passing region of the illumination light and the passing region of the image light overlap with each other at least in part between the reflective/transmissive surface and the reflective image display element, thus accomplishing the compactification of the illumination system and, in turn, the compactification of the entire apparatus.

When the projection optical element is one having a plurality of optical action surfaces including at least one reflective surface, among which at least one is a rotationally asymmetric surface, the apparatus can display an image with good quality corrected for various aberrations (distortion etc.).

Further, when the color image is displayed by carrying out the time sequential display switching of the color images of plural colors on the reflective image display element and switching the illumination light entering the reflective image display element among the colors according to the display color images in synchronism with the switching timing of the color images, the apparatus becomes able to implement display of high-definition imagery without pixel deviation among the colors.

Tenth Embodiment

Figure 26:
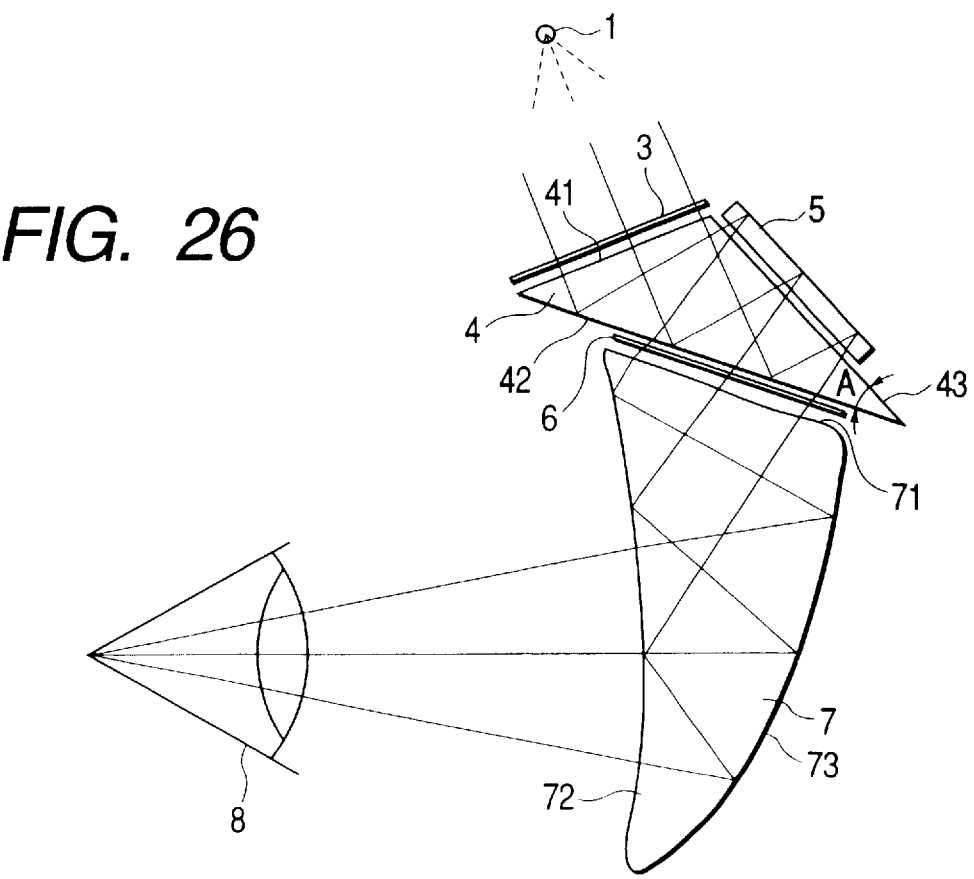
FIG. 26 is a structural diagram to show the main part of a head-mounted display as a tenth embodiment of the present invention.

FIG. 26 shows a head-mounted display (image display apparatus) as a tenth embodiment of the present invention.

The basic structure of the head-mounted display of the present embodiment is substantially the same as that in the first embodiment and common components are denoted by the same reference symbols as those in the first embodiment.

In the present embodiment analysis will be made about the angle A between the second surface 42 and the third surface 43 of the illumination prism 4, and the total reflection condition.

Figure 27:
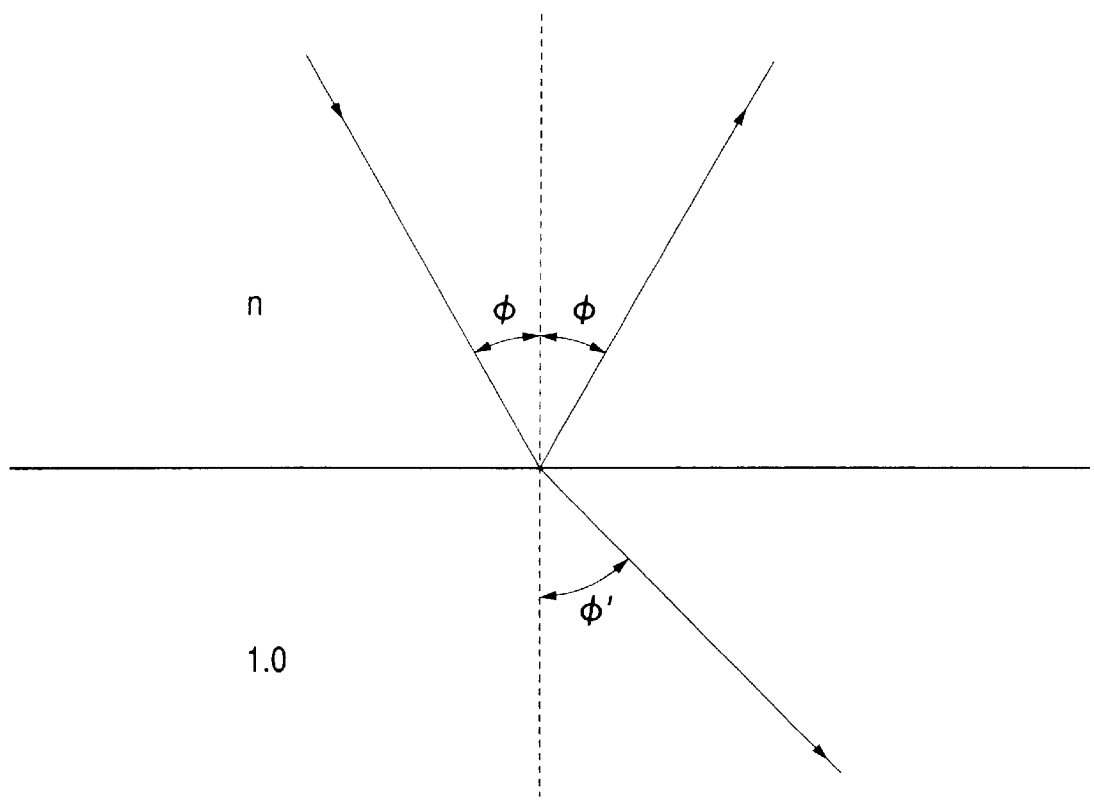
FIG. 27 is an explanatory diagram to illustrate Snell's law.

As illustrated in FIG. 27, let us consider a case in which light travels from the interior of a medium having a refractive index of n into air. Let φ be an angle of incidence of a ray and φ' be an angle of emergence of the ray. From Snell's law, the following relation holds.

$$n \cdot \sin\phi = \sin\phi'$$

Then, using this φ', we can express the reflectance Rp of the polarization component in the plane of incidence (P-polarized light) and the reflectance Rs of the polarization component in the plane normal to the plane of incidence (i.e., S-polarized light) as follows:

$$R_P = \left[\frac{\tan(\phi - \phi')}{\tan(\phi + \phi')}\right]^2$$

$$R_S = \left[\frac{\sin(\phi - \phi')}{\sin(\phi + \phi')}\right]^2.$$

Figure 28:
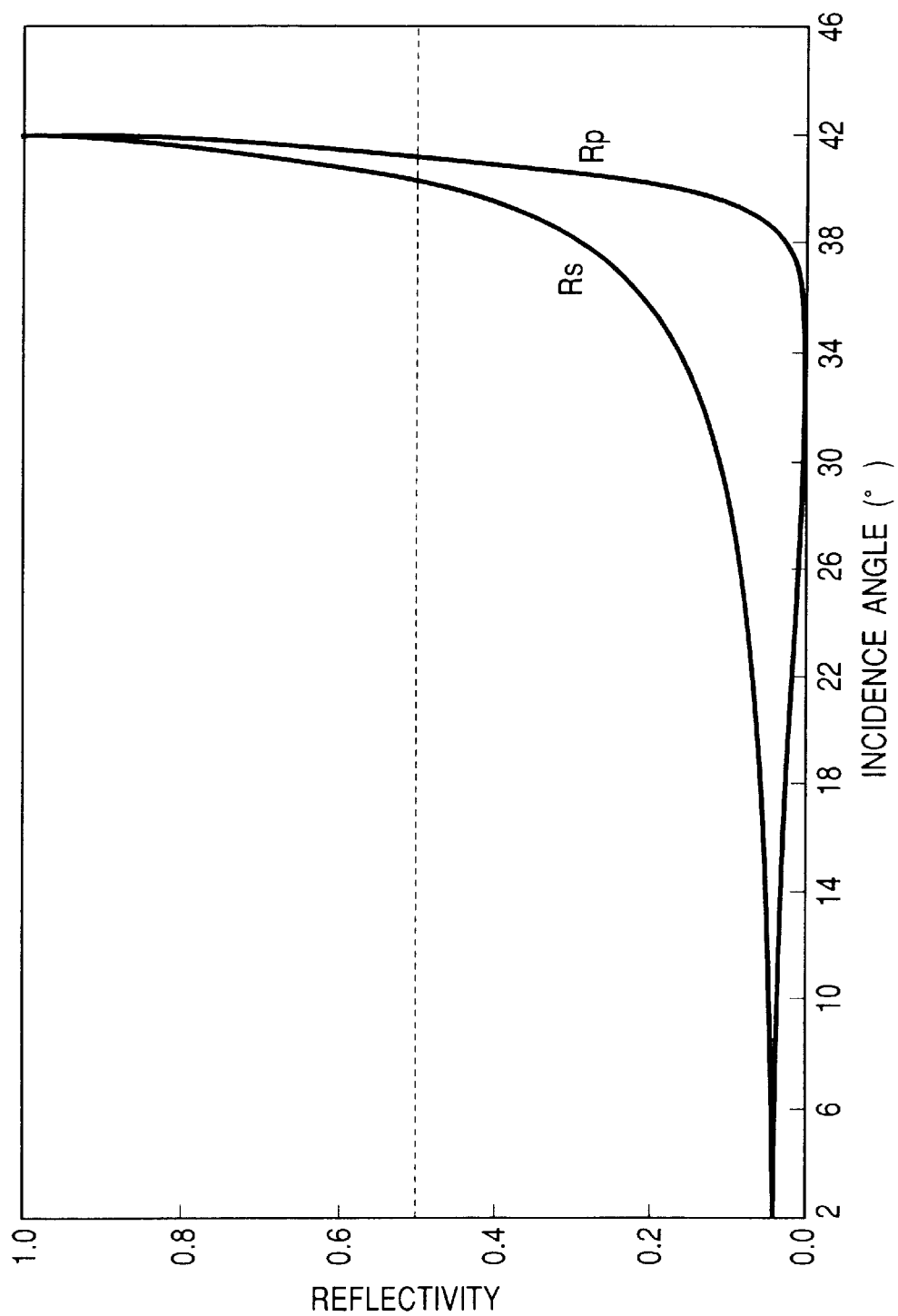
FIG. 28 is a diagram to illustrate the relation of reflectances with angles of incidence of P-polarized light and S-polarized light.

When the refractive index of the medium is 1.52, relations of the reflectances with angles of incidence are as presented in FIG. 28.

When φ indicates the angle of incidence of the illumination light to the second surface 42 of the illumination prism 4 and n the refractive index of the material making the illumination prism 4, the total reflection condition is met by satisfying the following relation:

$$\sin\phi \geq 1/n \qquad (1)$$

whereby the reflectance becomes 100%, thereby permitting effective illumination of the image display element.

When a glass material having the refractive index of 1.52 is used for the illumination prism 4, the total reflection condition on the second surface 42 is φ≧41.1°.

Figure 29:
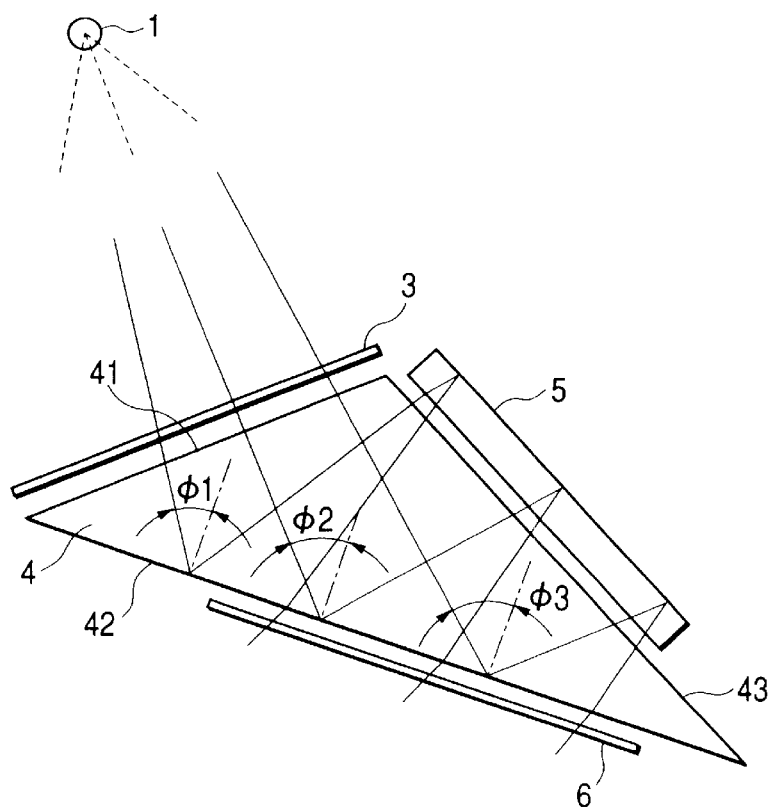
FIG. 29 is an enlarged view of the illumination system in the head-mounted display of the tenth embodiment.

In the case wherein the angles φ1 to φ3 of incidence of the illumination light to the second surface 42 of the illumination prism 4 are different depending upon locations on the second surface 42 as illustrated in FIG. 29, the reflectance R of the ray at the minimum incidence angle φ1 is desirably set to satisfy the following condition:

$$R \geq 0.5 \qquad (2).$$

Figure 30:
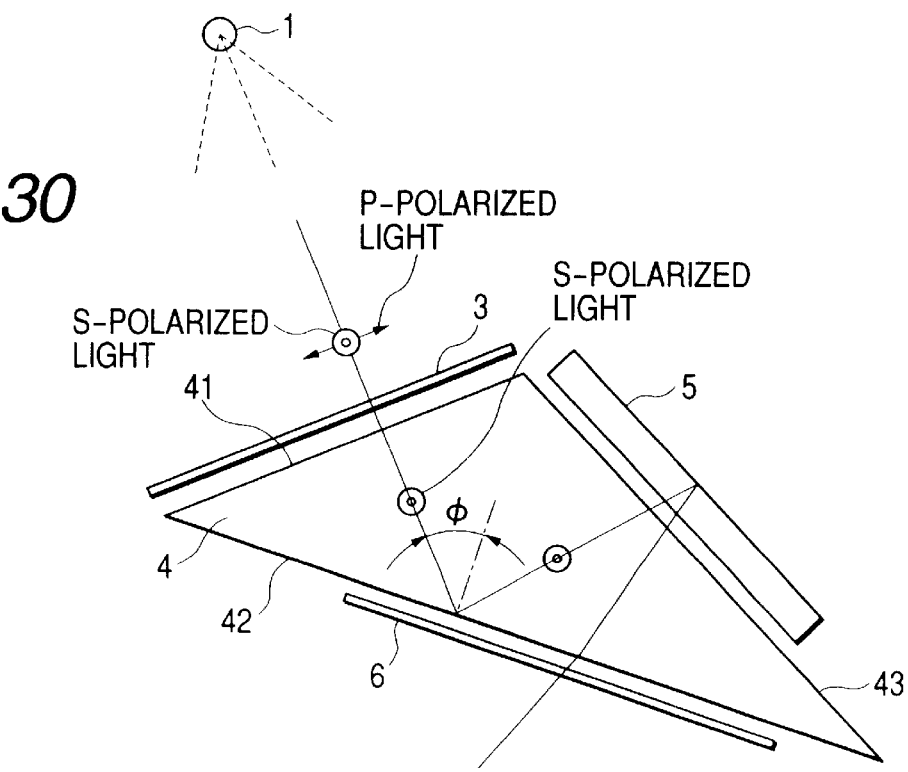
FIG. 30 is an explanatory diagram to illustrate the optical action in the head-mounted display of the tenth embodiment.

Since the S-polarized light has reflectances larger than the P-polarized light does at all the incidence angles as illustrated in FIG. 28, the tolerance of incidence angles for attainment of higher reflectances becomes wider when the S-polarized light is set along the polarization direction of the illumination light incident to the second surface 42 of the illumination prism 4 as illustrated in FIG. 30.

It is also preferable to form the reflective film in the region in which the reflectance R does not satisfy the following relation against the angles of incidence of the illumination light in the second surface 42 of the illumination prism 4:

$$R \geq 0.9 \qquad (3),$$

because the range of incidence angles of the light reflected in the illumination prism can be set wider.

The above describes the main structure and optical action in the image display apparatus of the present embodiment, and in the present embodiment an antireflection coating is provided on each of the side surfaces (surfaces except for the optical action surfaces of the first to the third surfaces) of the illumination prism 4 and the prism lens 7 to prevent reflection of light on each side surface, thereby preventing occurrence of flare and ghost.

Figure 31:
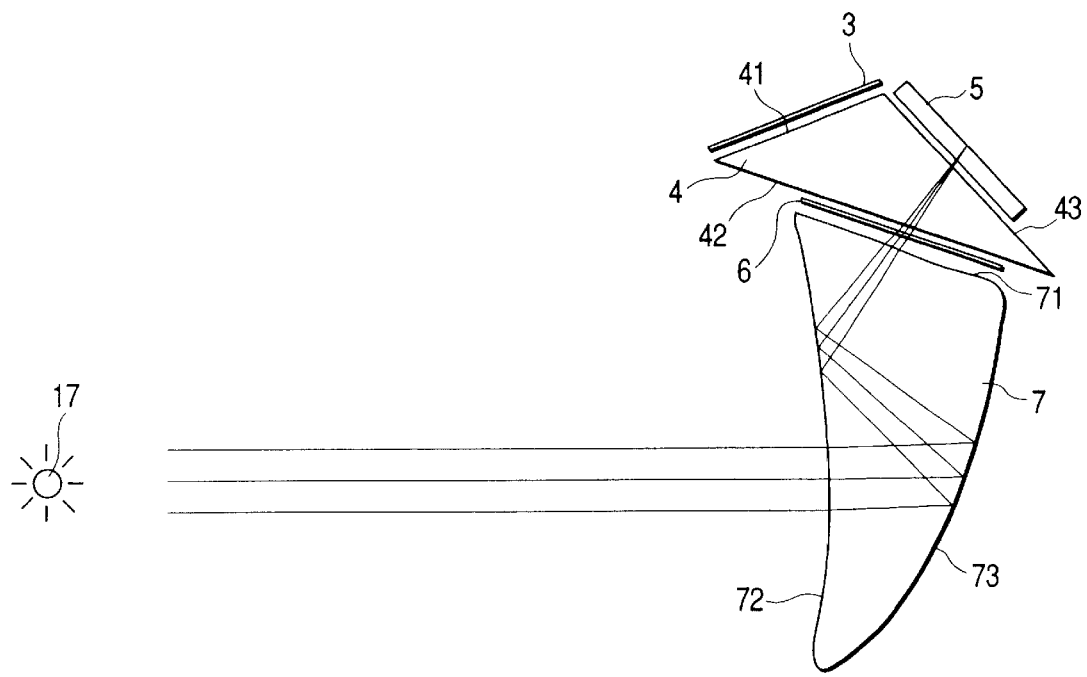
FIG. 31 is a diagram to illustrate a state of invasion of the sunlight into the head-mounted display of the tenth embodiment.

In the present embodiment each of the first and second polarizers 3, 6 is located 1 mm or more apart from the display panel 5. This arrangement prevents the sunlight 17 incident from the eye side from being focused on each of the polarizers 3, 6, as illustrated in FIG. 31. This prevents the deterioration of each polarizer 3, 6 due to the sunlight.

Since the present embodiment uses the optical glass with low birefringence as the illumination prism 4, there occurs no rotation of polarization in the illumination prism 4.

When the illumination prism is provided with lens action in order to produce the illumination prism 4 at low cost, it is easier to produce the illumination prism by molding. In this case, it is then desirable to satisfy the following condition; after the polarized light incident to the illumination prism 4 emerges from the prism lens 7 or after it emerges from the second polarizer 6, an intensity ratio of light in display of white and light in display of black on the display panel 5 is 50:1 or higher.

Further, in the present embodiment, the display panel 5 is fixed to the illumination prism 4 through an unrepresented holding member, and the display panel 5, together with the illumination prism 4, can be adjusted in position relative to the prism lens 7.

This arrangement permits position adjustment of the display panel relative to the prism lens 7 without changing the optical layout of the display panel 5 and the illumination prism 4, so as to be able to attain the optimum arrangement of the elements without change of optical performance.

Figure 32:
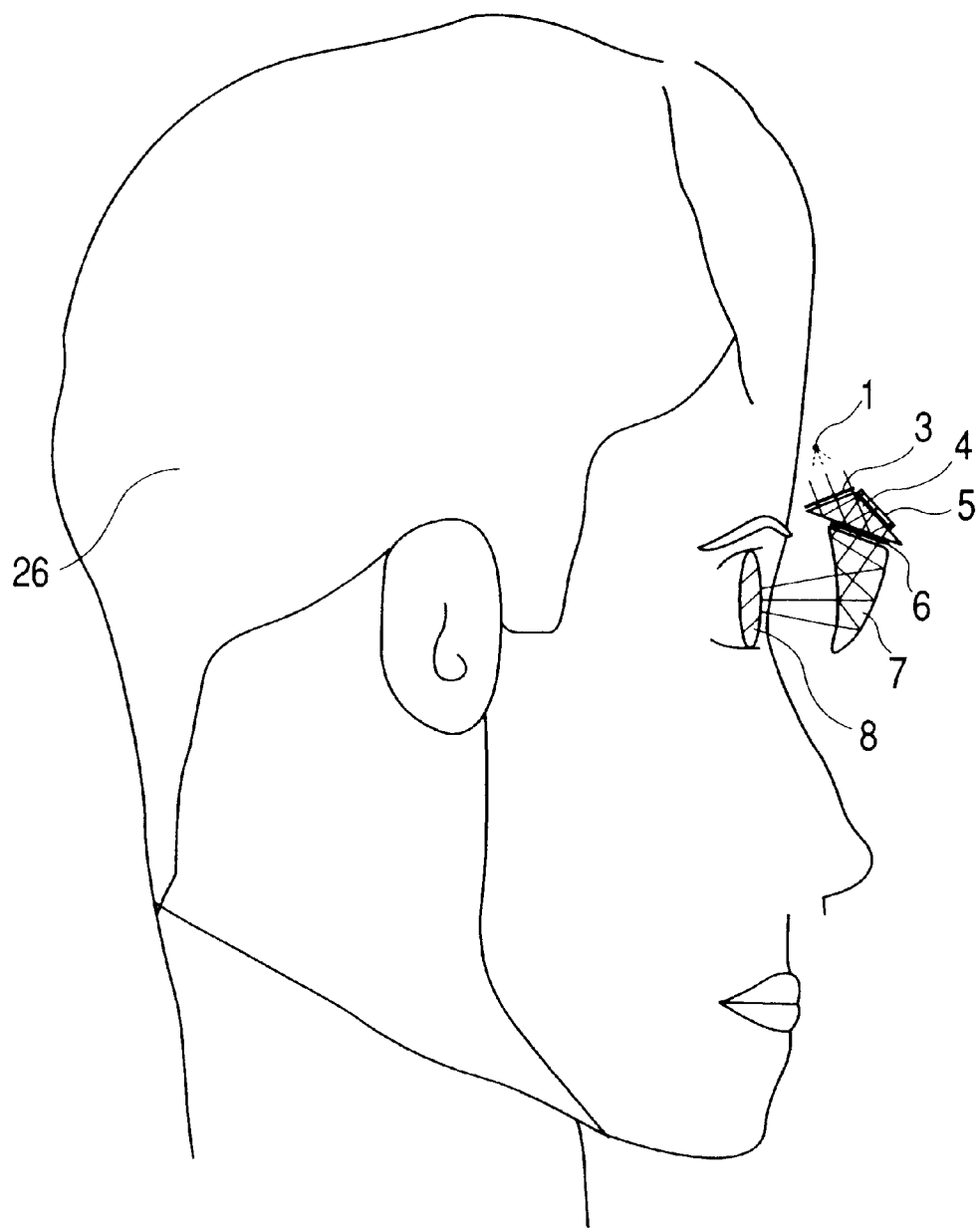
FIG. 32 is a layout diagram of the head-mounted display of the tenth embodiment.

The image display apparatus constructed as described above is mounted in a vertical layout as a whole so that the light source 1, the display panel 5, the first and second polarizers 3, 6, and the illumination prism 4 are located above the height of the prism lens 7 and the observer's left and right eyes 8, as illustrated in FIG. 32.

Then this image display apparatus is connected to an image output device such as a video system, a television, a personal computer, a DVD, or the like not illustrated, thus composing an image display system. When the image output device supplies an image to the image display apparatus, the image is displayed on the display panel 5 whereby the observer observes the image enlarged by the prism lens 7.

Eleventh Embodiment

Figure 33:
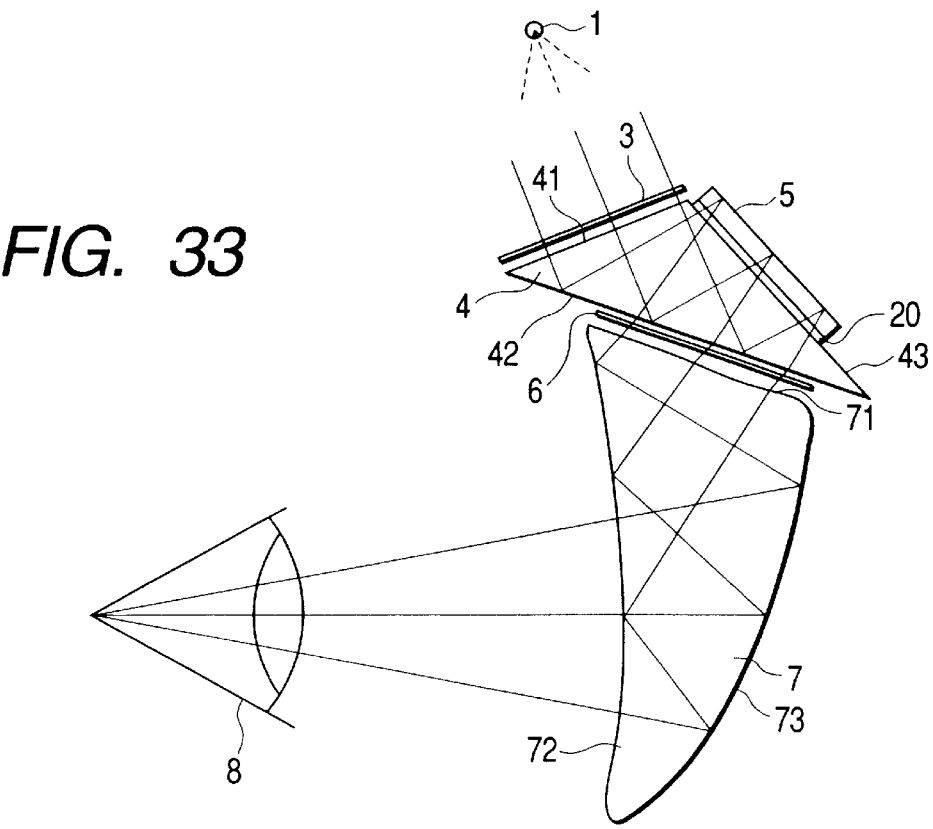
FIG. 33 is a structural diagram to show the main part of a head-mounted display as an eleventh embodiment of the present invention.

FIG. 33 shows a head-mounted display (image display apparatus) as an eleventh embodiment of the present invention. The basic structure of the head-mounted display of the present embodiment is substantially the same as that in the first embodiment and common components are denoted by the same reference symbols as those in the first embodiment.

In the present embodiment, the illumination light having passed through the first polarizer 3 (the polarized light) is caused to be incident on the display panel 5 through a phase plate 20 placed between the illumination prism 4 and the display panel 5, rather than being directly incident on the display panel 5 as in the first embodiment.

This structure allows the polarized light after conversion into the optimum polarization direction to be incident on the display panel 5 and is thus effective in improvement in image quality and the like.

Twelfth Embodiment

Figure 34:
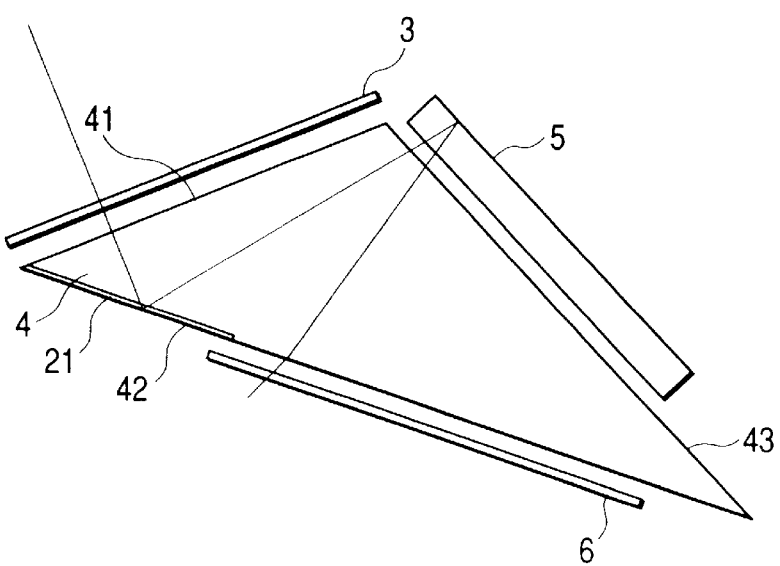
FIG. 34 is an enlarged view of the illumination system in the head-mounted display of a twelfth embodiment of the present invention.

FIG. 34 shows the structure of the illumination system in a head-mounted display (image display apparatus) as a twelfth embodiment of the present invention. The basic structure of the head-mounted display of the present embodiment is substantially the same as that in the first embodiment and common components are denoted by the same reference symbols as those in the first embodiment.

In the present embodiment, a reflective film 21 is provided on the region of the second surface 42 in which angles of incidence of the illumination light to this second surface 42 do not satisfy the aforementioned condition of Eq. (3) when the illumination light from the light source 1 is reflected by the second surface 42 after transmitted through the first surface 41 of the illumination prism 4.

This structure can expand the range of incidence angles of the illumination light reflected on the second surface 42 of the illumination prism 4.

Thirteenth Embodiment

Figure 35:
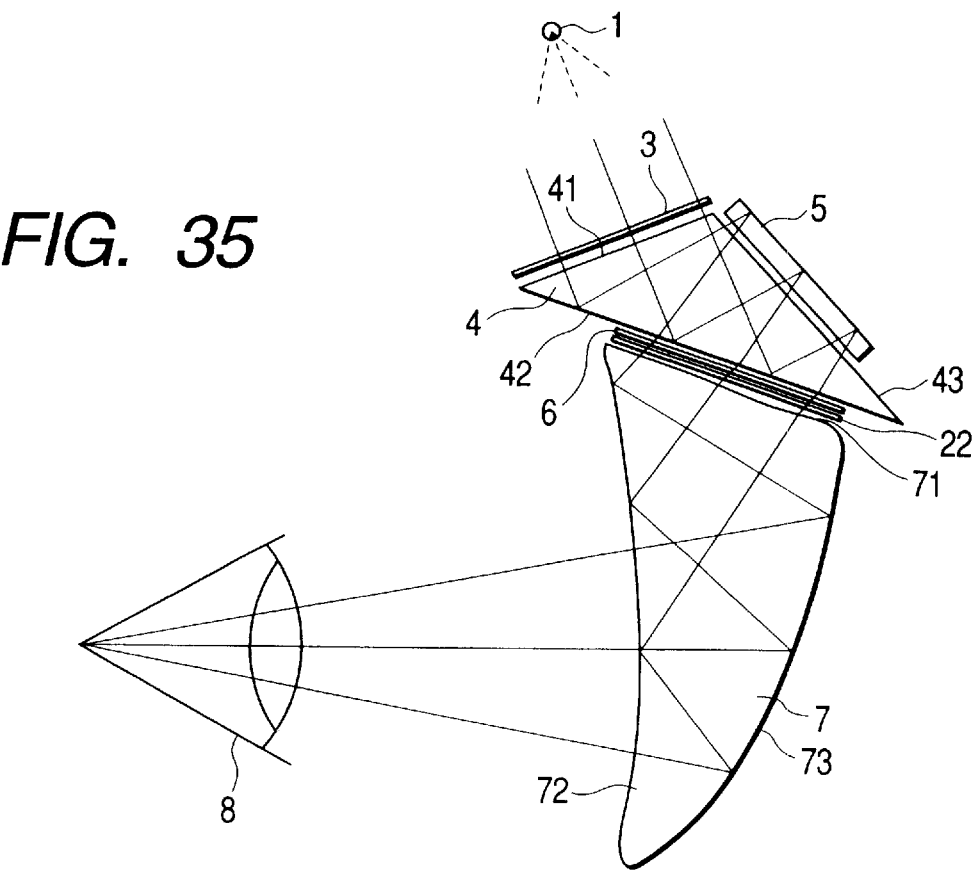
FIG. 35 is a structural diagram to show the main part of a head-mounted display as a thirteenth embodiment of the present invention.

FIG. 35 shows the structure of a head-mounted display (image display apparatus) as a thirteenth embodiment of the present invention. The basic structure of the head-mounted display of the present embodiment is substantially the same as that in the first embodiment and common components are denoted by the same reference symbols as those in the first embodiment.

In the present embodiment a quarter-wave plate 22 is disposed between the second polarizer 6 and the prism lens 7 to convert the image light passing through the prism lens 7, into a state different from the linearly polarized light.

This structure can reduce influence of birefringence on the image light inside the prism lens 7 and thus effect display of image with good quality, when compared with the case wherein the image light passing through the prism lens 7 is the linearly polarized light.

Fourteenth Embodiment

Figure 36:
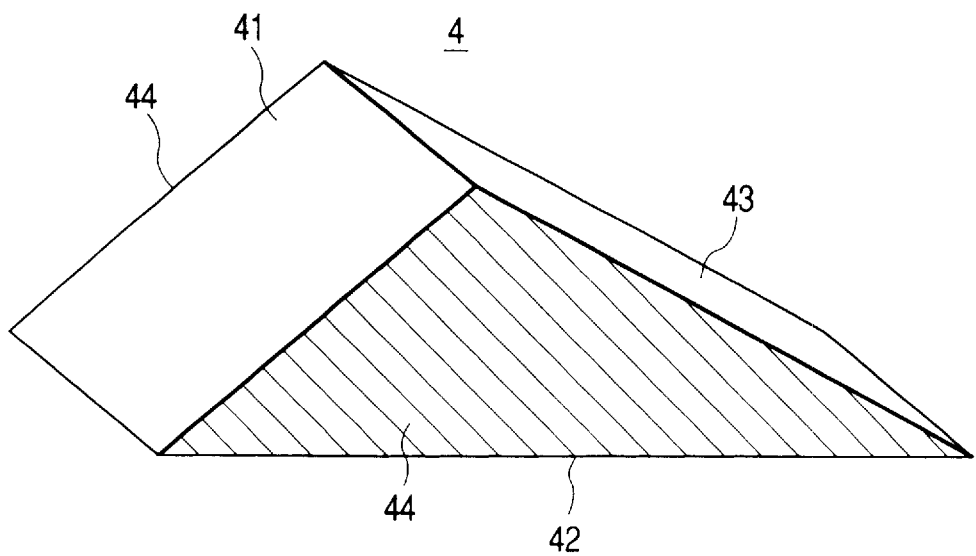
FIG. 36 is an enlarged view of an illumination prism used in a head-mounted display as a fourteenth embodiment of the present invention.

FIG. 36 shows an illumination prism used in a head-mounted display (image display apparatus) as a fourteenth embodiment of the present invention. The basic structure of the head-mounted display of the present embodiment is substantially the same as that in the first embodiment and common components are denoted by the same reference symbols as that in the first embodiment.

In the present embodiment the side surfaces (the surfaces other than the optical action surfaces) 44 of the illumination prism 4 are constructed of diffusing surfaces coated with a black paint having the light absorbing property.

In this structure, the unnecessary light impinging on the side surfaces 44 of the illumination prism 4 is diffused by the diffusing surfaces and absorbed by the black paint, whereby irregular reflection is prevented effectively.

Fifteenth Embodiment

Figure 37:
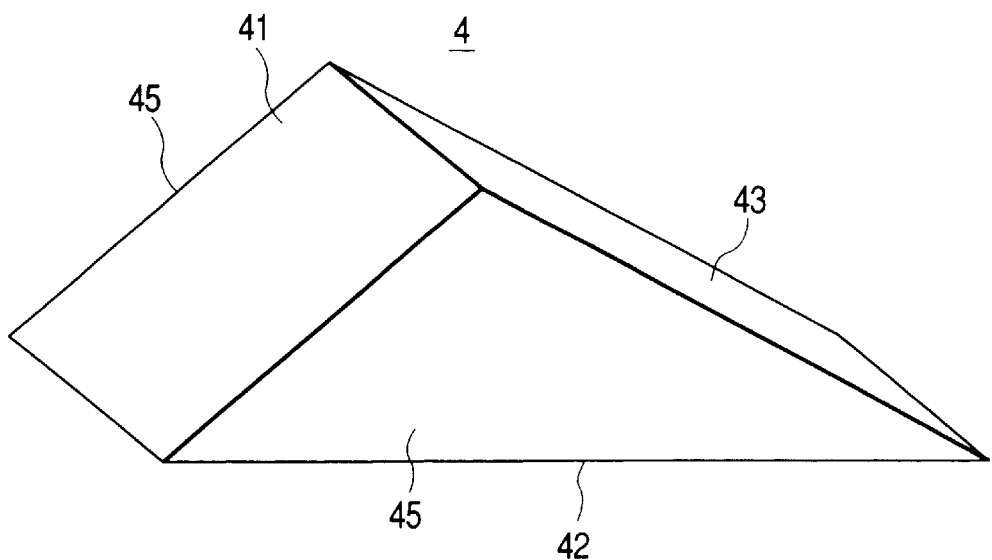
FIG. 37 is an enlarged view of an illumination prism used in a head-mounted display as a fifteenth embodiment of the present invention.

FIG. 37 shows an illumination prism used in a head-mounted display (image display apparatus) as a fifteenth embodiment of the present invention. The basic structure of the head-mounted display of the present embodiment is substantially the same as that in the first embodiment and common components are denoted by the same reference symbols as those in the first embodiment.

In the present embodiment, the side surfaces (the surfaces other than the optical action surfaces) 45 of the illumination prism 3 are polished surfaces and antireflection coatings (not illustrated) are further laid thereon.

This structure allows the unnecessary light impinging on the side surfaces 45 from the interior of the illumination prism 4 to be transmitted as it is, whereby the unnecessary light is prevented from being reflected inside the illumination prism 4 and becoming unnecessary light.

Sixteenth Embodiment

Figure 38:
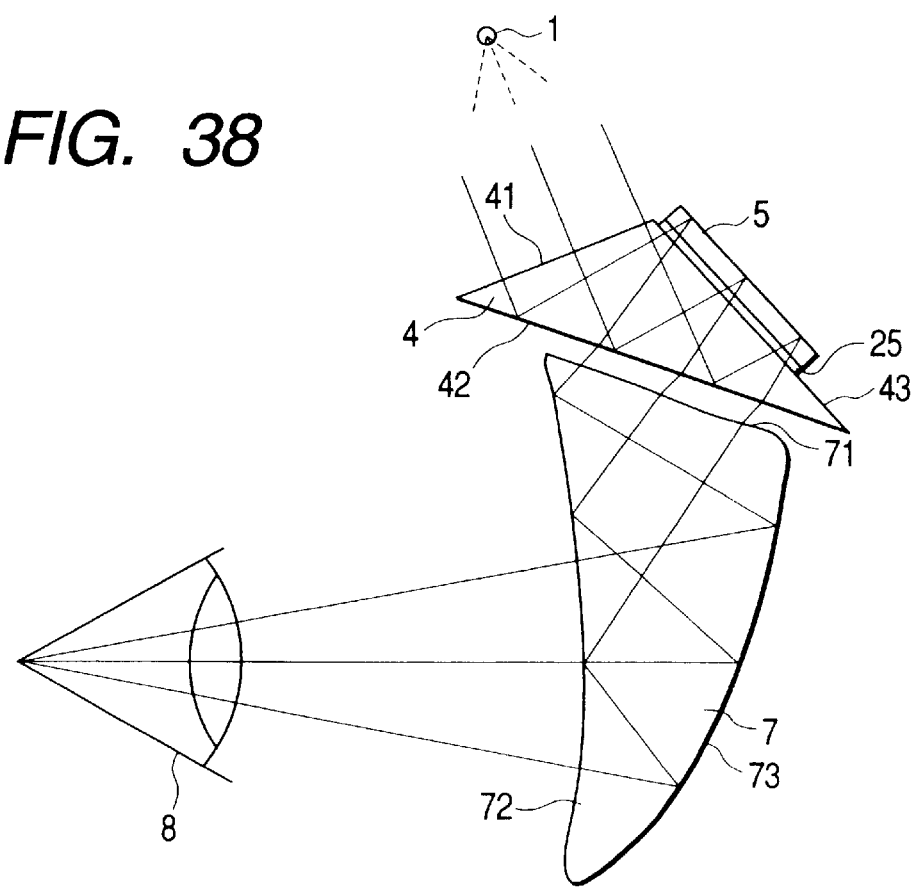
FIG. 38 is a structural diagram to show the main part of a head-mounted display as a sixteenth embodiment of the present invention.

FIG. 38 shows the structure of a head-mounted display (image display apparatus) as a sixteenth embodiment of the present invention. The basic structure of the head-mounted display of the present embodiment is substantially the same as that in the first embodiment and common components are denoted by the same reference symbols as those in the first embodiment.

The first embodiment was the example in which the polarizers 3, 6 were placed before and after the illumination prism 4, whereas the present embodiment is an example in which a polarizer 25 is placed between the illumination prism 4 and the display panel 5.

The polarizer 25 used in the present embodiment is one to convert the illumination light emerging from the illumination prism 4, into polarized light having the first polarization direction and convert the image light emerging from the display panel 4, into polarized light having the same polarization direction as the first polarization direction.

This structure decreases the number of components in the apparatus and permits more compact structure of the apparatus, as compared with the configurations using two polarizers.

Seventeenth Embodiment

Figure 39:
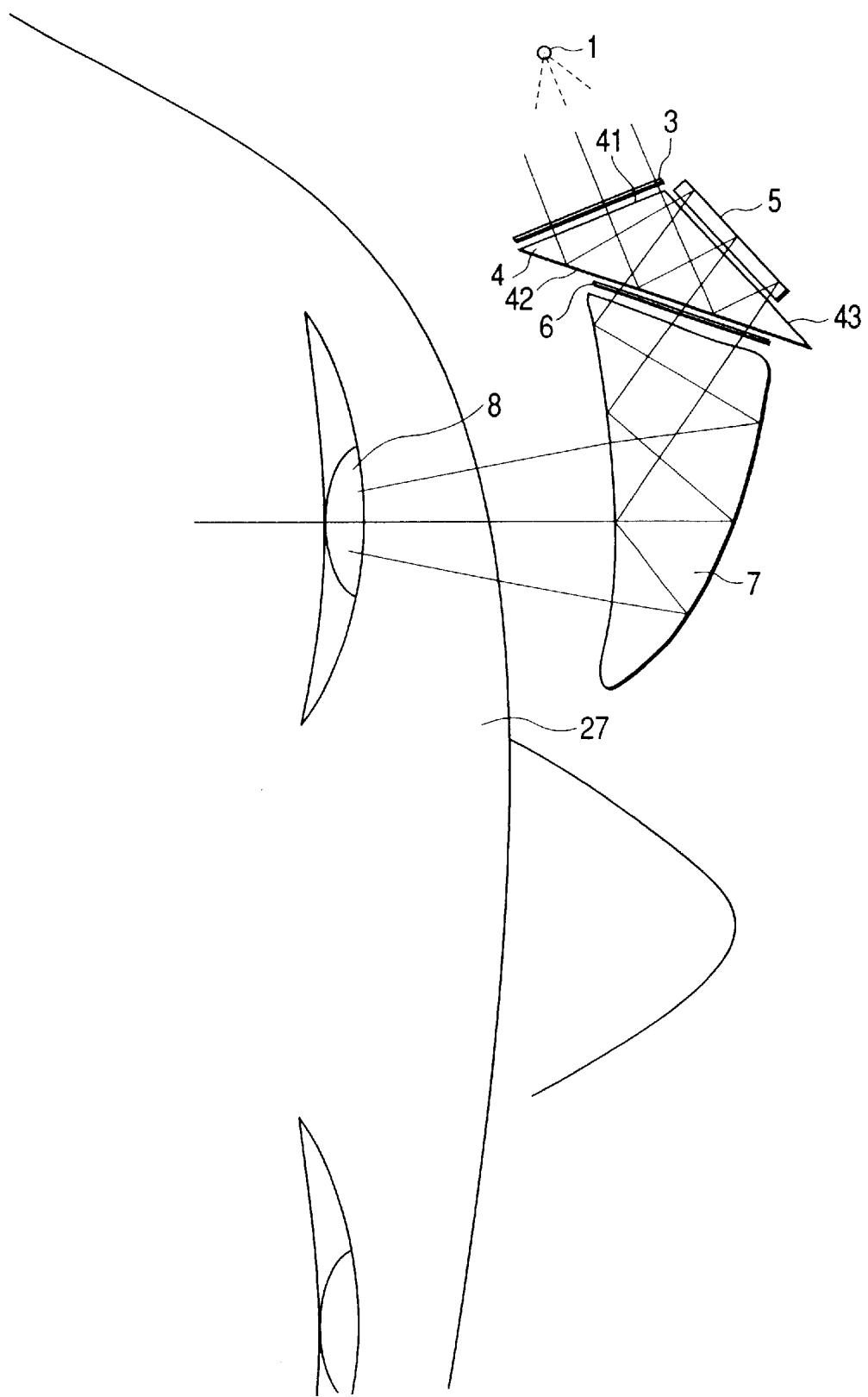
FIG. 39 is a layout diagram of a head-mounted display of a seventeenth embodiment.

FIG. 39 shows a layout of a head-mounted display (image display apparatus) as a seventeenth embodiment of the present invention. The basic structure of the head-mounted display of the present embodiment is substantially the same as that in the first embodiment and common components are denoted by the same reference symbols as those in the first embodiment.

In the present embodiment, different from the tenth embodiment, the apparatus is arranged in a horizontal layout as a whole so that the light source 1, the display panel 5, the first and second polarizers 3, 6, and the illumination prism 4 are located at the same height as the height of the prism lens 7 and the observer's left and right eyes 8.

Numerical Examples

Numerical Examples 6 to 9 for the tenth to seventeenth embodiments will be described below.

The shapes of the optical action surfaces in Numerical Examples 6 to 9 are those having an aspherical surface expressed by the shape function indicating the quadratic surface, plus the Zernike polynomials as described previously.

Numerical Example 6 is the component data of the tenth embodiment and is of the form used in the layout illustrated in FIG. 32.

<Numerical Example 6>
f = 17.8   N = 1.57
wx (half angle of view in the x-direction) = 15.0 deg,
wy (half angle of view in the y-direction) = 11.2 deg,
prism n (refractive index of prism lens) = 1.571

| S1 | r: ∞ | | d: 24.36 | | n: 1.0000 |
|----|------|---|----------|---|-----------|
| S2 | dY −66.17 | | dZ 24.36 | | Tilt −6.96 |
|    | r: −457.224 | | | | |
|    | c4: −9.305e−04 | c5: −3.229e−04 | | c9: 3.505e−07 | |
|    | c10: −7.323e−06 | c11: 9.125e−08 | | c12: −3.783e−09 | |
|    | c13: −1.514e−09 | c19: −4.593e−11 | | c20: −6.705e−12 | |
|    | c21: 8.148e−10 | c22: −3.195e−12 | | c23: −1.139e−12 | |
|    | c24: 7.100e−13 | c25: −6.199e−13 | | | |

-continued

| | | | |
|---|---|---|---|
| S3 | dy −1.87 | dZ 36.84 | Tilt −29.99 |
| | r: −51.716 | | |
| | c4: −1.851e−03 | c5: −2.129e−03 | c9: −9.909e−06 |
| | c10: −4.449e−06 | c11: 3.818e−08 | c12: −3.436e−07 |
| | c13: −3.451e−07 | c19: −1.065e−08 | c20: −1.655e−09 |
| | c21: −1.859e−09 | c22: −2.324e−10 | c23: 4.922e−11 |
| | c24: −2.111e−10 | c25: −4.289e−11 | |
| S4 | dY −66.17 | dZ 24.36 | Tilt −6.96 |
| | r: −457.224 | | |
| | c4: −9.305e−04 | c5: −3.229e−04 | c9: 3.505e−07 |
| | c10: −7.323e−06 | c11: 9.125e−08 | c12: −3.783e−09 |
| | c13: −1.514e−09 | c19: −4.593e−11 | c20: −6.705e−12 |
| | c21: 8.148e−10 | c22: −3.195e−12 | c23: −1.139e−12 |
| | c24: 7.100e−13 | c25: −6.199e−13 | |
| S5 | dY 10.09 | dZ 42.84 | Tilt 40.06 |
| | r: −120.292 | | |
| | c4: 2.142e−02 | c5: −5.012e−03 | c9: −5.723e−04 |
| | c10: −1.025e−03 | c11: −3.201e−05 | c12: −1.789e−06 |
| | c13: 3.509e−05 | c19: −4.617e−07 | c20: 2.780e−06 |
| | c21: 2.896e−07 | c22: 0.000e+00 | c23: 0.000e+00 |
| | c24: 0.000e+00 | c25: 0.000e+00 | |
| S6 | dY 16.45 | dZ 37.48 | Tilt 52.54 |
| S6 | r: ∞ | d: −1.34 | n: 1.0000 |
| S7 | dY 15.39 | dZ 36.66 | Tilt 58.96 |
| S7 | r ∞ | d: 3.34 | n: 1.5163 |
| S8 | dY 18.04 | dZ 38.70 | Tilt 34.91 |
| S8 | r: ∞ | d: 0.10 | n: 1.0000 |
| S9 | r: ∞ | d: 1.10 | n: 1.5230 |
| S10 | r: ∞ | d: 0.00 | n: 1.0000 |

In the above table, Si (i=1, 2, 3, 4, 5, P) represent the three surfaces of the prism lens, the two surfaces of the illumination prism, and the image plane of the display panel as illustrated in FIG. 18. Further, f is a value equivalent to the focal length of the prism lens, which was calculated by the following equation, using the incidence angle $\phi$ of the incident light from the object at infinity and the image height $y_m$ of rays of the light focused on the panel in the backward tracing from the observer's eye:

$$f = y_m / \tan(\Theta).$$

This will be simply called the focal length herein.

Angle A between surface 42 and surface 43: $24.1° \geq 15°$, $\leq 45°$.

Incidence angle $\phi$: $\phi = 41.261 \geq \sin^{-1}(1/n)$.

Location of the first polarizer: 0.8 mm from the first surface of the illumination prism; or air-reduced length from the image plane of the display panel: 8.1 mm $\geq$ 1 mm.

Location of the second polarizer: 0.5 mm from the second surface of the illumination prism; or air-reduced length from the image plane of the display panel: 3.5 mm $\geq$ 1 mm.

Numerical Example 7 is the component data of the seventeenth embodiment and is of the form used as arranged in the layout illustrated in FIG. 39.

<Numerical Example 7>
f = 24.7   N = 1.57
wx (half angle of view in the x-direction) = 8.2 deg,
wy (half angle of view in the y-direction) = 11.0 deg.
prism n (refractive index of prism lens) = 1.571

| | | | |
|---|---|---|---|
| S1 | r: ∞ | d: 31.51 | n: 1.0000 |
| S2 | dY 7.40 | dZ 31.51 | Tilt 6.18 |
| | r: −125.683 | | |
| | c4: −2.042e−03 | c5: −1.392e−03 | c9: −5.849e−05 |
| | c10: −3.988e−05 | c11: −1.565e−07 | c12: 1.487e−07 |

-continued

| | | | |
|---|---|---|---|
| | c13: −7.932e−07 | c19: 6.972e−10 | c20: −7.498e−08 |
| | c21: −2.922e−07 | c22: 6.857e−09 | c23: −5.076e−10 |
| | c24: 7.780e−10 | c25: −6.330e−10 | |
| S3 | dY 0.15 | dZ 40.91 | Tilt −20.22 |
| | r: −43.176 | | |
| | c4: −8.911e−04 | c5 1.504e−04 | c9: −8.852e−08 |
| | c10: −8.996e−06 | c11: 1.094e−07 | c12: 4.103e−07 |
| | c13: −2.058e−07 | c19: 2.214e−08 | c20: −3.350e−08 |
| | c21: −1.961e−08 | c22: 9.588e−11 | c23: −3.566e−10 |
| | c24: 5.986e−10 | c25: −3.213e−10 | |
| S4 | dY 7.40 | dZ 31.51 | Tilt 6.18 |
| | r: −125.683 | | |
| | c4: −2.042e−03 | c5: −1.392e−03 | c9: −5.849e−05 |
| | c10: −3.988e−05 | c11: 1.565e−07 | c12: 1.487e−07 |
| | c13: −7.932e−07 | c19: 6.972e−10 | c20: −7.498e−08 |
| | c21: −2.922e−07 | c22: 6.857e−09 | c23: −5.076e−10 |
| | c24: 7.780e−10 | c25: −6.330e−10 | |
| S5 | dY 14.54 | dZ 38.86 | Tilt 69.69 |
| | r: 37.831 | | |
| | c4: 8.371e−03 | c5 1.218e−03 | c9: −2.518e−04 |
| | c10: −4.090e−04 | c11: −1.738e−05 | c12: −1.413e−05 |
| | c13: −9.072e−06 | c19: 4.686e−07 | c20: 2.161e−06 |
| | c21: −3.586e−06 | c22: −1.663e−07 | c23: 5.347e−08 |
| | c24: −9.508e−09 | c25: −2.946e−09 | |
| S6 | dY 15.42 | dZ 39.36 | Tilt 47.57 |
| S6 | r: ∞ | d: 0.86 | n: 1.0000 |
| S7 | dY 16.05 | dZ 39.94 | Tilt 70.83 |
| S7 | r: ∞ | d: 3.50 | n: 1.5163 |
| S8 | dY 18.64 | dZ 42.30 | Tilt 42.60 |
| S8 | r: ∞ | d: 0.54 | n: 1.0000 |
| S9 | dY 21.58 | dZ 40.33 | Tilt 42.60 |
| S9 | r: ∞ | d: 1.10 | n: 1.5230 |
| S10 | r: ∞ | d: 0.00 | n: 1.0000 |

Angle A between surface 42 and surface 43: $28.2° \geq 15°$, $\leq 45°$

Incidence angle $\phi$: $\phi = 41.261 \geq \sin^{-1}(1/n)$

Figure 40:
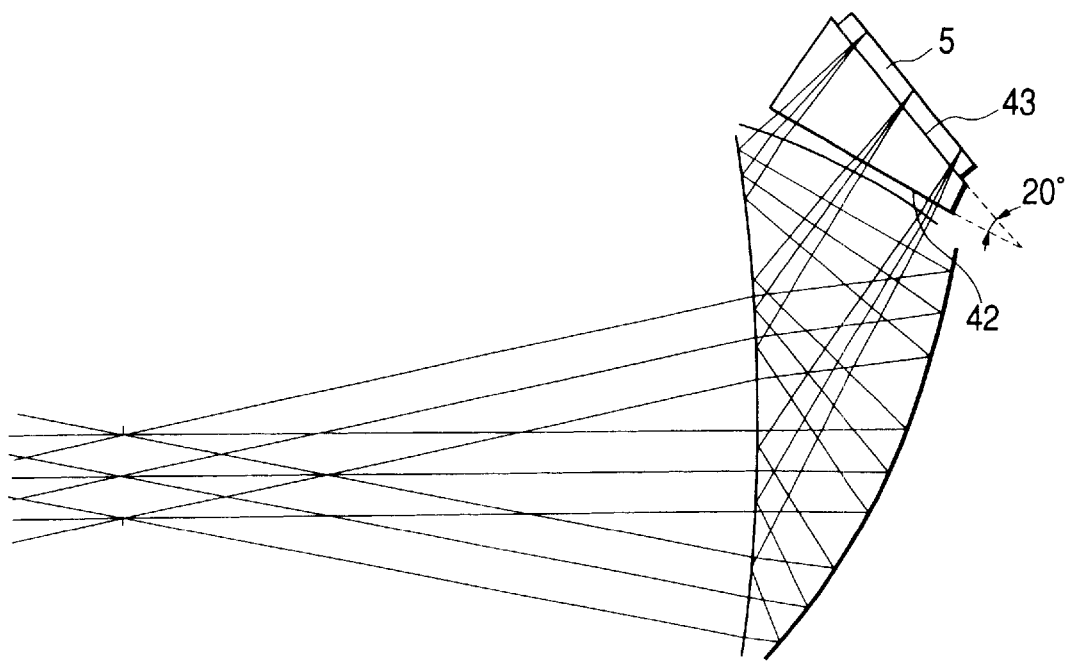
FIG. 40 is a schematic structural diagram to illustrate the optical systems in Numerical Example 6 of the present invention.

Location of the first polarizer: 0.8 mm from the first surface of the illumination prism; or air-reduced length from the image plane of the display panel: 10.8 mm $\geq$ 1 mm Location of the second polarizer: 0.5 mm from the second surface of the illumination prism; or air-reduced length from the image plane of the display panel: 5.0 mm $\geq$ 1 mm Numerical Example 8 is the component data of the embodiment illustrated in FIG. 40 and is of the form used in the layout illustrated in FIG. 32.

<Numerical Example 8>
f = 17.8   N = 1.57
wx (half angle of view in the x-direction) = 15.0 deg,
wy (half angle of view in the y-direction) = 11.2 deg.
prism n (refractive index of prism lens) = 1.571

| | | | |
|---|---|---|---|
| S1 | r: ∞ | d: 24.17 | n: 1.0000 |
| S2 | dY −66.73 | dZ 24.17 | Tilt −7.10 |
| | r: −461.057 | | |
| | c4: −9.444e−04 | c5: −3.179e−04 | c9: 3.564e−07 |
| | c10: −7.425e−06 | c11: 9.172e−08 | c12: 3.545e−09 |
| | c13: −1.750e−09 | c19: −4.939e−11 | c20: −3.042e−12 |
| | c21: 8.185e−10 | c22: −3.273e−12 | c23: −1.195e−12 |
| | c24: 7.481e−13 | c25: −6.502e−13 | |
| S3 | dY −2.25 | dZ 36.56 | Tilt −29.69 |
| | r: −50.649 | | |
| | c4: −1.480e−03 | c5: −2.235e−03 | c9: −6.528e−06 |
| | c10: −7.977e−06 | c11: −2.321e−07 | c12: −6.635e−07 |
| | c13: −3.385e−07 | c19: −1.215e−08 | c20: 1.096e−09 |
| | c21: −9.376e−09 | c22: −2.647e−10 | c23: 2.971e−10 |
| | c24: −6.479e−11 | c25: −2.963e−12 | |

-continued

| S4 | dY −66.73 | dZ 24.17 | Tilt −7.10 |
|---|---|---|---|
| | r: −461.057 | | |
| | c4: −9.444e−04 | c5: −3.179e−04 | c9: 3.564e−07 |
| | c10: −7.425e−06 | c11: 9.172e−08 | c12: −3.545e−09 |
| | c13: −1.750e−09 | c19: −4.939e−11 | c20: −3.042e−12 |
| | c21: 8.185e−10 | c22: −3.273e−12 | c23: −1.195e−12 |
| | c24: 7.481e−13 | c25: −6.502e−13 | |
| S5 | dY 9.43 | dZ 42.79 | Tilt 39.73 |
| | r: −188.044 | | |
| | c4: 2.032e−02 | c5: −4.318e−03 | c9: −4.827e−04 |
| | c10: −9.667e−04 | c11: −4.276e−05 | c12: −1.416e−06 |
| | c13: 3.236e−05 | c19: −5.986e−07 | c20: 3.505e−07 |
| | c21: 7.541e−07 | c22: 0.000e+00 | c23: 0.000e+00 |
| | c24: 0.000e+00 | c25: 0.000e+00 | |
| S6 | dY 16.05 | dZ 37.28 | Tilt 55.67 |
| S6 | r: ∞ | d: −1.37 | n: 1.0000 |
| S7 | dY 14.93 | dZ 36.51 | Tilt 59.82 |
| S7 | r: ∞ | d: 3.34 | n: 1.5163 |
| S8 | dY 17.68 | dZ 38.40 | Tilt 39.83 |
| S8 | r: ∞ | d: 0.10 | n: 1.0000 |
| S9 | r: ∞ | d: 1.10 | n: 1.5230 |
| S10 | r: | d: 0.00 | n: 1.0000 |

Angle A between surface 42 and surface 43: $20° \geq 15°$, $\leq 45°$.

Incidence angle $\phi$: $\phi = 28.143 \leq \sin^{-1}(1/n)$.

(In this case, Eq. (1) is not met and thus the reflective film is formed on a part of the second surface 42 of the illumination prism 4.)

Location of the first polarizer: 0.8 mm from the first surface of the illumination prism; or air-reduced length from the image plane of the display panel: $8.0 \text{ mm} \geq 1 \text{ mm}$.

Location of the second polarizer: 0.5 mm from the second surface of the illumination prism; or air-reduced length from the image plane of the display panel: $3.4 \text{ mm} \geq 1 \text{ mm}$.

Figure 41:
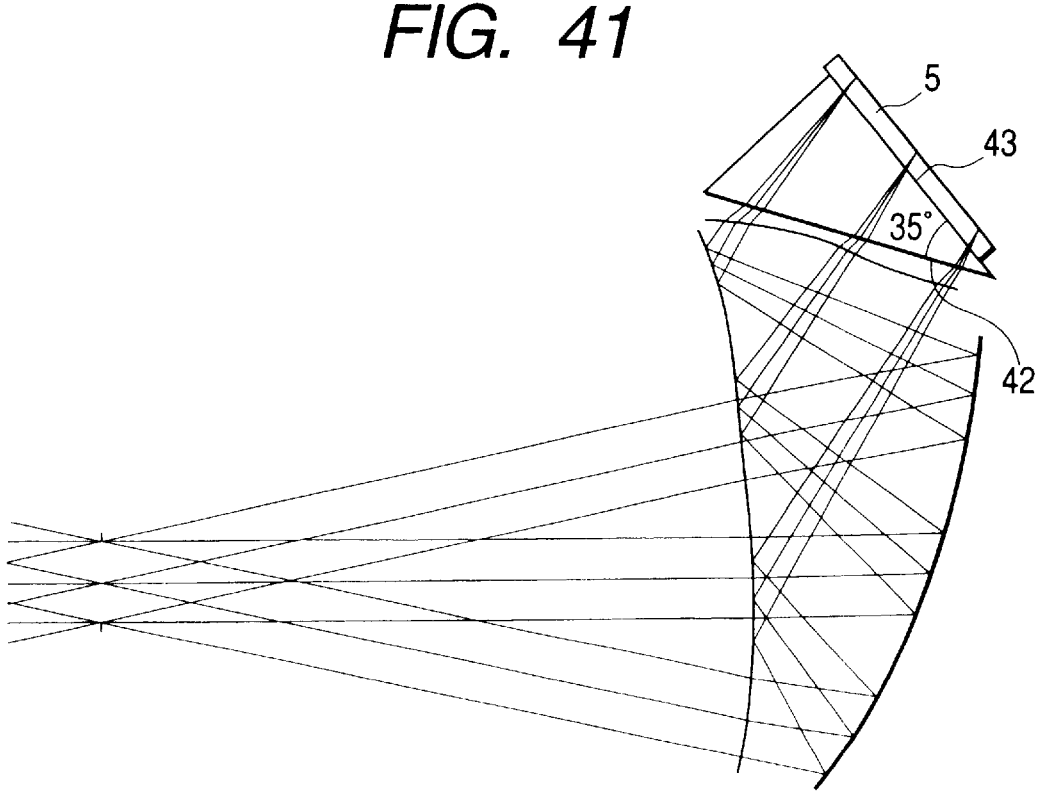
FIG. 41 is a schematic structural diagram to illustrate the optical systems in Numerical Example 7 of the present invention.

Numerical Example 9 is the component data of the embodiment illustrated in FIG. 41 and is of the form used in the layout illustrated in FIG. 32.

```
<Numerical Example 9>
f = 22.6   N = 1.57
wx (half angle of view in the x-direction) =  9.0 deg,
wy (half angle of view in the y-direction) = 12.0 deg,
prism n (refractive index of prism lens) = 1.571
```

| S1 | r ∞ | d: 31.56 | n: 1.0000 |
|---|---|---|---|
| S2 | dY 7.46 | dZ 31.56 | Tilt 5.98 |
| | r: −114.711 | | |
| | c4: −2.212e−03 | c5: −1.249e−03 | c9: −7.147e−05 |
| | c10: 2.639e−05 | c11: −1.532e−06 | c12: 1.469e−06 |
| | c13: −1.899e−06 | c19: −3.953e−08 | c20: −1.158e−08 |
| | c21: −2.287e−07 | c22: 5.759e−09 | c23: −2.109e−09 |
| | c24: 1.554e−09 | c25: −5.815e−10 | |
| S3 | dY 0.08 | dZ 40.90 | Tilt −20.02 |
| | r: −41.444 | | |
| | c4: −1.043e−03 | c5: 1.010e−04 | c9: −4.528e−06 |
| | c10: 5.442e−06 | c11: −1.857e−07 | c12: 4.407e−07 |
| | c13: −4.390e−07 | c19: 2.782e−08 | c20: −4.086e−08 |
| | c21: 1.772e−08 | c22: 6.484e−10 | c23: −4.474e−10 |
| | c24: 6.306e−10 | c25: −2.124e−10 | |
| S4 | dY 7.46 | dZ 31.56 | Tilt 5.98 |
| | r: −114.717 | | |
| | c4: −2.212e−03 | c5: −1.249e−03 | c9: −7.747e−05 |
| | c10: 2.639e−05 | c11: −1.532e−06 | c12: 1.439e−06 |
| | c13: −1.899e−06 | c19: −3.953e−08 | c20: −1.158e−08 |
| | c21: −2.287e−07 | c22: 5.759e−09 | c23: −2.109e−09 |
| | c24: 1.554e−09 | c25: −5.815e−10 | |
| S5 | dY 15.11 | dZ 38.83 | Tilt 68.87 |
| | r: 37.281 | | |
| | c4: 1.192e−02 | c5: 8.644e−04 | c9: −5.232e−04 |
| | c10: 1.041e−04 | c11: −2.871e−06 | c12: 1.514e−05 |
| | c13: 6.027e−06 | c19: −1.216e−07 | c20: 4.707e−07 |
| | c21: −5.263e−06 | c22: −3.467e−07 | c23: −7.974e−09 |
| | c24: −3.626e−08 | c25: −3.647e−09 | |
| S6 | dY 16.23 | dZ 38.72 | Tilt 18.60 |
| S6 | r: | d: −0.20 | n: 1.0000 |
| S7 | dY 16.17 | dZ 38.53 | Tilt 73.71 |
| S7 | r: | d: 3.50 | n: 1.5163 |
| S8 | dY 17.28 | dZ 41.85 | Tilt 38.73 |
| S8 | r ∞ | d: 0.10 | n: 1.0000 |
| S9 | dY 20.07 | dZ 39.74 | Tilt 38.73 |
| S9 | r: | d: 1.10 | n: 1.5230 |
| S10 | r | d: 0.00 | n: 1.0000 |

Angle A between surface 42 and surface 43: $35° \geq 15° \leq 45°$.

Incidence angle $\phi$: $\phi = 47.9 \geq \sin^{-1}(1/n)$.

Location of the first polarizer: 0.8 mm from the first surface of the illumination prism; or air-reduced length from the image plane of the display panel: $9.9 \text{ mm} \geq 1 \text{ mm}$.

Location of the second polarizer: 0.5 mm from the second surface of the illumination prism; or air-reduced length from the image plane of the display panel: $3.9 \text{ mm} \geq 1 \text{ mm}$.

According to the image display apparatus of the embodiments described above, it becomes feasible to realize the image display apparatus having the extremely simple and compact structure, having the wide angles of view, and yielding no unwanted flare. Since the image display apparatus uses the reflective image display element, it can be one ready for high-definition images such as output of personal computers or the like.

In addition, when the projection optical element is constructed in the structure wherein it has a plurality of optical action surfaces including at least one reflective surface and wherein at least one of these optical action surfaces is a rotationally asymmetric surface, the image display apparatus can be constructed in more compact structure and be well corrected for the aberrations.

The image display apparatus capable of display of image with good quality can be constructed in such structure that the surfaces other than the optical action surfaces in the illumination prism and the projection optical element are constructed of polished surfaces and that antireflection coatings are placed on the polished surfaces to transmit the unnecessary light impinging on the surfaces other than the optical action surfaces from the interior of the illumination prism as it is, whereby the light is prevented from being reflected toward the interior of the illumination prism, or in such structure that the portions other than the optical action surfaces are constructed of diffusing surfaces and that the diffusing surfaces are coated with a paint having the light absorbing property to prevent the irregular reflection of the unnecessary light.

When the polarization direction of the light incident to the third surface of the illumination prism is aligned with that of the S-polarized light, reflectances of rays thereof become higher than those of the P-polarized light, so as to be able to widen the tolerance of incidence angles of the illumination light to the third surface of the illumination prism.

Further, when the reflective image display element is fixed to the illumination prism through the holding member or the like and is adjustable together with the illumination prism in position relative to the projection optical element, the display element can be adjusted in the position relative to the projection optical element without changing the optical layout of the reflective image display element and the illumination prism, so as to be able to attain the optimum arrangement of each element without change of optical performance.

It is also feasible to implement the display of the image with high quality (high definition) without pixel deviation among colors, by controlling the reflective image display element in the time sequential display switching (field sequential display) among the color images of the plural colors and carrying out the display of the color image in switching among the colors according to the display color images, of the illumination light incident to the reflective image display element in synchronism with the switching timing of the color images.

Eighteenth Embodiment

Another head-mounted display (image display apparatus) will be described as an eighteenth embodiment of the present invention. The basic structure of the head-mounted display of the present embodiment is substantially the same as that in the first embodiment and common components will be denoted by the same reference symbols as those in the first embodiment.

In the present embodiment geometrical conditions will be discussed for illuminating the display panel 5 without an eclipse of the illumination light.

Figure 42B:
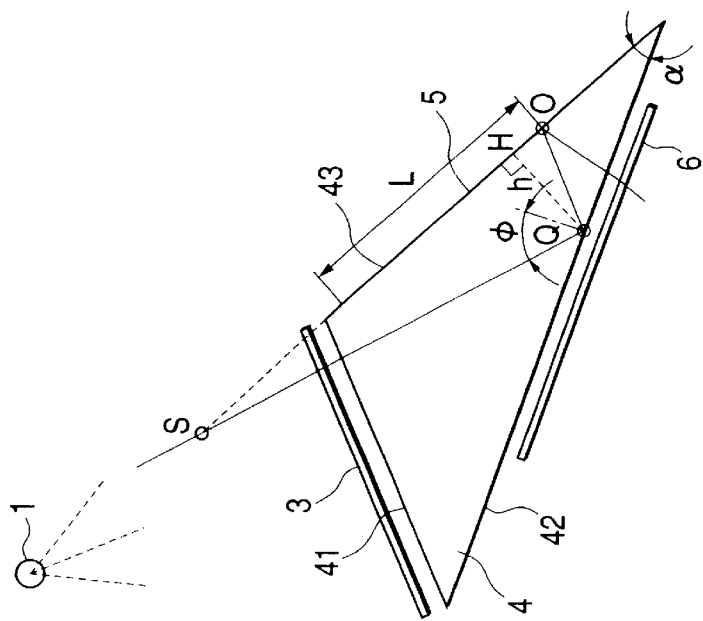
FIGS. 42A and 43B are explanatory diagrams of the illumination system in a head-mounted display of an eighteenth embodiment of the present invention.
Figure 42A:
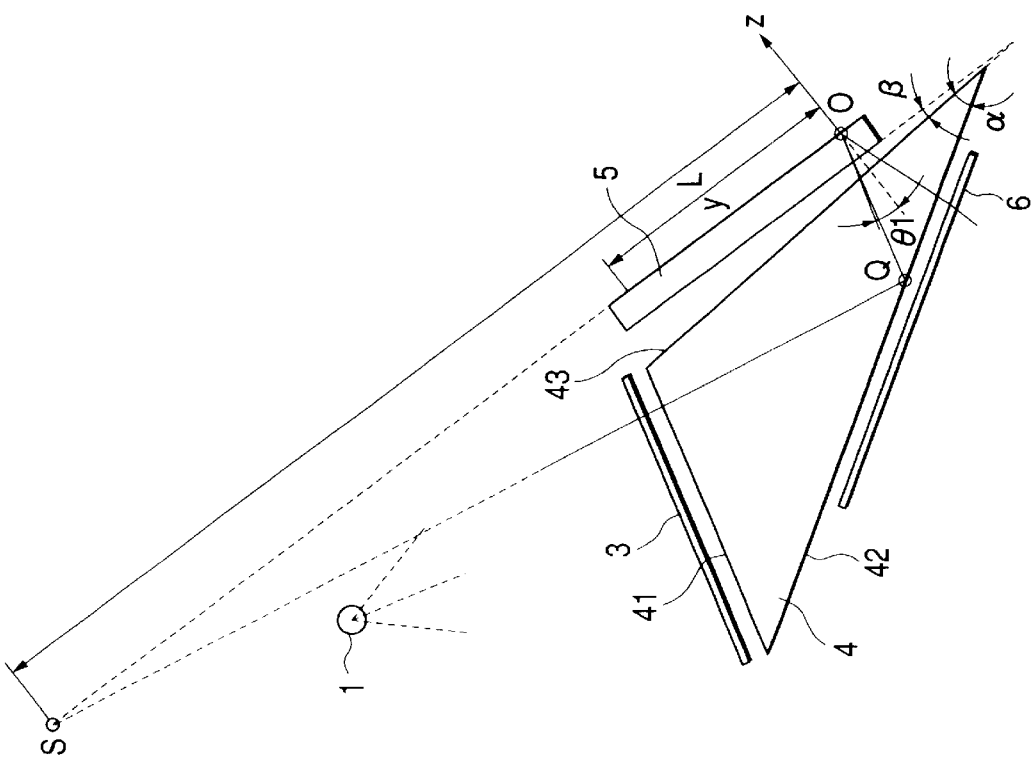

As illustrated in FIG. 42A, let $\alpha$ be the angle between the second surface 42 and the third surface 43 of the illumination prism 4, $\beta$ be the angle between the third surface 43 of the illumination prism 4 and the display panel 5, $\ominus_1$ be an incidence angle of the illumination light illuminating the lower end in the figure of the display panel 5, into the display panel 5, and L be a length of the side of the display panel 4.

In a coordinate system wherein the origin O is set at the lower end of the display panel 5, the positive direction of the y-axis is taken along the direction from the lower end to the upper end along the side of the display panel 5, and the positive direction of the z-axis is taken along a direction normal to the y-axis and backward from the display panel 5; coordinates $z_q$, $y_q$ represent z-coordinate and y-coordinate, respectively, of point Q where the illumination light illuminating the lower end of the display panel 5 is reflected on the second surface 42 of the illumination prism 4. At this time, a straight line drawn by a ray emitted from the light source 1, entering the illumination prism 4, and reflected at the point Q is expressed as follows in the above coordinate system:

$$y = \left\{-z_q \cdot \tan(\beta - \gamma_1) - 2z_q \cdot \frac{\tan(\alpha + \beta) - \tan(\beta - \gamma_1)}{\tan(\alpha + \beta) + 1/\tan(\alpha + \beta)}\right\} \cdot \quad (4).$$

$$(z - z_q) / \left\{2z_q \cdot \frac{\tan(\alpha + \beta) - \tan(\beta - \gamma_1)}{\tan(\alpha + \beta) + 1/\tan(\alpha + \beta)} - z_q\right\} + y_q$$

$$\text{where } \gamma = \sin^{-1}\left\{\frac{1}{n}\sin(\beta + \theta_1)\right\}$$

If the illumination optical system is constructed to satisfy the following condition that a value $y_s$ of y-coordinate at the z-coordinate of 0 of the straight line represented by this Eq. (4) (that point being indicated by S) is larger than the length L of the side of the display panel 5;

$$y_s = \frac{\tan(\beta - \gamma_1) \cdot \{\tan(\alpha + \beta) - 1/\tan(\alpha + \beta) + 2/\tan(\beta - \gamma_1)\}}{\tan(\alpha + \beta) - 1/\tan(\alpha + \beta) - 2\tan(\beta - \gamma_1)}. \quad (5)$$

$$z_q + y_q > L$$

$$\text{where } \gamma = \sin^{-1}\left\{\frac{1}{n}\sin(\beta + \theta_1)\right\}$$

it becomes feasible to illuminate the display panel 5 without an eclipse of the light from the light source 1 due to the display panel 5.

This Eq. (5) will be geometrically simplified on the assumption that the illumination light illuminating the lower end of the display panel 5 is totally reflected by the second surface 42 of the illumination prism 4, $\beta$ is sufficiently small, and the display surface of the display panel 5 is sufficiently close to the third surface 43 of the illumination prism 4, as illustrated in FIG. 42B.

Let h be a distance between the display panel 5 and the point Q where the illumination light illuminating the lower end of the display panel 5 is totally reflected on the second surface 42 of the illumination prism 4, $\phi$ be an incidence angle of the illumination light incident to the second surface 42, and H be a point of the foot of a perpendicular from the point Q to the display panel 4. Then segments OH and HS are expressed by the respective equations below:

$$OH \cong h\tan(\phi - \alpha)$$

$$HS \cong h\tan(\phi + \alpha) \quad (6).$$

The segment OS is thus given by the following equation:

$$OS \cong h\{\tan(\phi - \alpha) + \tan(\phi + \alpha)\} \quad (7).$$

The condition is that the segment OS is larger than the length L of the side of the display panel 4.
Therefore, the condition to be met is as follows.

$$\tan(\phi - \alpha) + \tan(\phi + \alpha) > L/h \quad (8).$$

By setting $\phi$ to the critical angle $\epsilon \equiv \sin^{-1}(1/n)$ to satisfy the total reflection condition and considering actual h, Eq. (8) is rewritten as follows.

$$\tan(\epsilon - \alpha) + \tan(\epsilon + \alpha) > L/12 \quad (9).$$

By satisfying this Condition (9), it becomes feasible to prevent the illumination light incident from the light source 1 into the illumination prism 4 from being eclipsed by the display panel 5 before illuminating the display panel 5 and thus implement display of image with good quality in wide angles of view in the compact structure.

In the region below the lower limit of Eq. (9), according to the backward tracing of rays from the observer's eye 8, the ray transmitted by the prism lens 7 and the illumination prism 4 and thereafter reflected at the lower end of the display panel 5 is again incident to the illumination prism 4, is reflected by the second surface 42 of the illumination prism 4, and thereafter is eclipsed by the display panel 5. Therefore, the lower region of the display panel 5 becomes an unilluminated area.

Figure 43A:
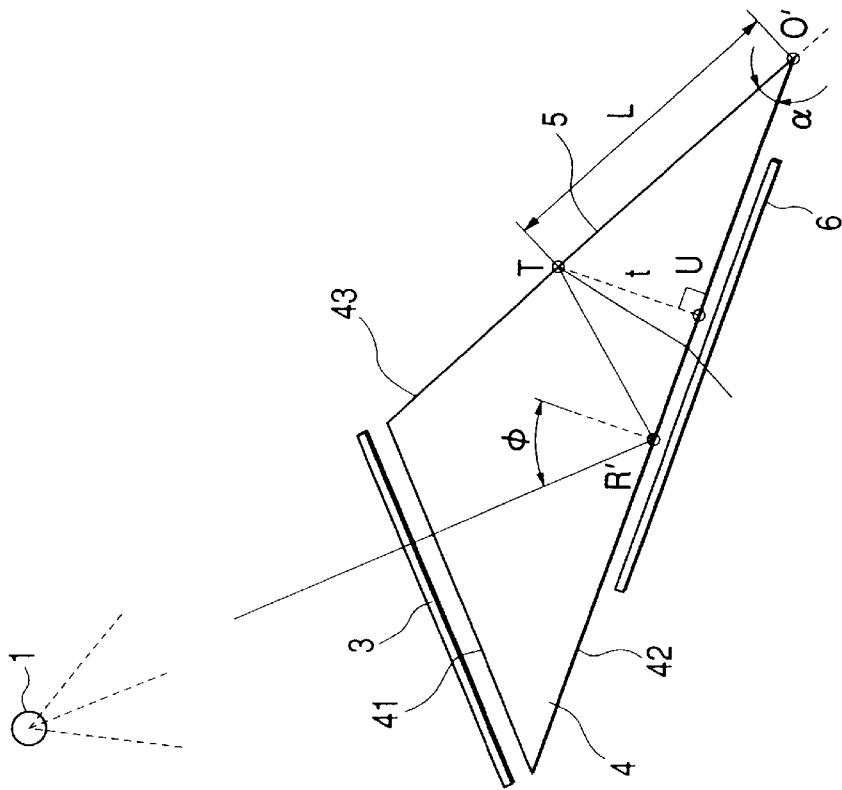

As illustrated in FIG. 43A, let $\ominus_2$ be an incidence angle of the illumination light illuminating the upper end of the display panel 4, into the display panel 4, and $z_p$, $y_p$ be z-coordinate and y-coordinate, respectively, of point P where the illumination light illuminating the upper end of the display panel 5 is transmitted by the third surface 43 of the illumination prism 4. Then the coordinates $z_p$, $y_p$ of the point P are expressed as follows, using $z_q$, $y_q$:

$$z_p = \left[\frac{z_q \cdot \tan(\beta - \gamma_2) - y_q}{\tan\beta \cdot \{\tan\theta_2 + \tan(\beta - \gamma_2)\}} + \frac{y_q \cdot \tan\theta_2 - z_q \cdot \tan\theta_2 \cdot \tan(\beta - \gamma_2)}{\tan\theta_2 + \tan(\beta - \gamma_2)} - L\right] / (1/\tan\beta - \tan\theta_2) \quad (10).$$

$$y_p = \tan\theta \cdot \left[\frac{z_q \cdot \tan(\beta - \gamma_2) - y_q}{\tan\beta \cdot \{\tan\theta_2 + \tan(\beta - \gamma_2)\}} + \frac{y_q \cdot \tan\theta - z_q \cdot \tan\theta \cdot \tan(\beta - \gamma_2)}{\tan\theta_2 + \tan(\beta - \gamma_2)} - L\right] /$$

$$(1/\tan\beta - \tan\theta_2) + L$$

where $\gamma_2 = \sin^{-1}\left\{\frac{1}{n}\sin(\beta + \theta_2)\right\}$

Let $z_r$, $y_r$ be z-coordinate and y-coordinate, respectively, of point R where the illumination light illuminating the upper end of the display panel 5 is reflected on the second surface 42 of the illumination prism 4. Then the coordinates $z_r$, $y_r$ of the point R are expressed by the respective equations below, using $z_p$, $y_p$:

$$z_r = \frac{z_q + y_q \cdot \tan(\alpha + \beta) + z_p \cdot \tan(\alpha + \beta) \cdot \tan(\beta - \gamma_2) - y_p \cdot \tan(\alpha + \beta)}{1 + \tan(\alpha + \beta) \cdot \tan(\beta - \gamma_2)} \quad (11).$$

$$y_r = \frac{y_q \cdot \tan(\alpha + \beta) \cdot \tan(\beta - \gamma_2) + z_q \cdot \tan(\beta - \gamma_2) - y_p - z_p \cdot \tan(\beta - \gamma)}{1 + \tan(\alpha + \beta) \cdot \tan(\beta - \gamma_2)}$$

where $\gamma_2 = \sin^{-1}\left\{\frac{1}{n}\sin(\beta + \theta_2)\right\}$

If these $z_r$, $y_r$ are determined so as to satisfy the following condition for placing the point R at the position not so far from the origin O;

$$Z_r^2 + y_r^2 \leq 800 \quad (12),$$

the illumination prism 4 can be constructed in size not so large.

Figure 43B:
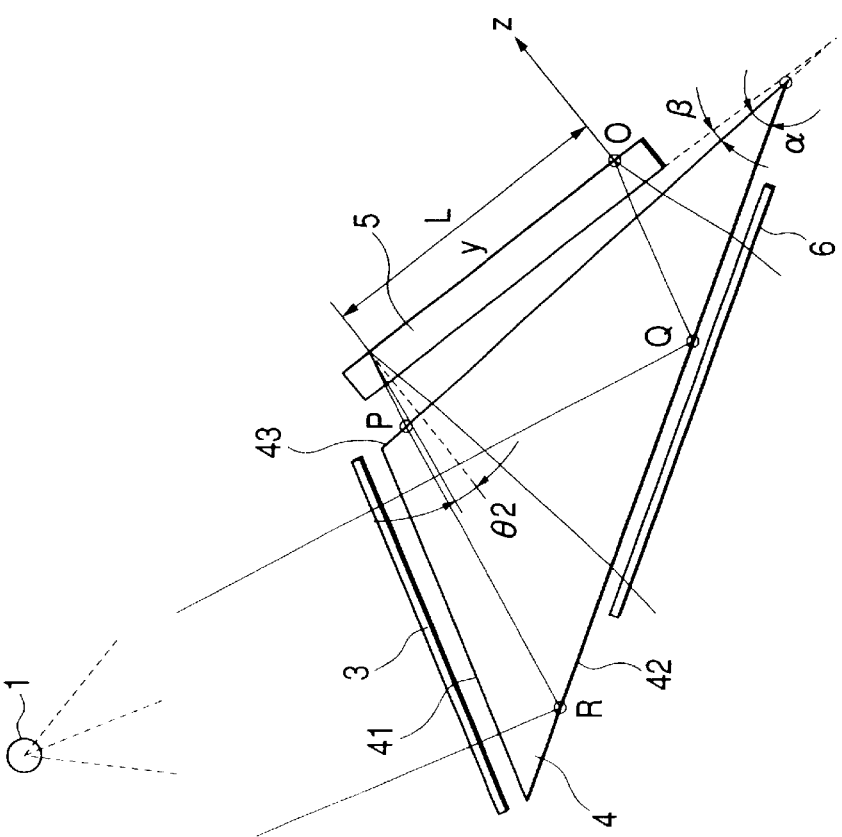

Above Eqs. (10), (11), (12) will be geometrically simplified by translationally moving the display panel 5 so as to bring the origin O onto the vertex O' of the illumination prism 4 on the assumption that the illumination light illuminating the upper end of the display panel 5 is totally reflected on the second surface 42 of the illumination prism 4, β is sufficiently small, and the display panel 5 is sufficiently close to the third surface 43 of the illumination prism 4, as illustrated in FIG. 43B.

Let T be the point at the upper end of the display panel 5, t be the distance between this point T and the second surface 42 of the illumination prism 4, U be a point of the foot of a perpendicular from the point T to the second surface 42 of the illumination prism 4, and φ be an incidence angle of the illumination light illuminating the upper end of the display panel 5, incident onto the second surface 42 of the illumination prism 4. Then segments O'U, UR' are expressed by the respective equations below:

$$O'U \cong L\cos\alpha$$

$$UR' \cong t/\{\tan(\pi/2 - \phi)\} \cdot t \cdot \tan\phi \quad (13).$$

Thus the segment O'R' is given as follows, using $t \cong L\sin\alpha$:

$$O'R' \cong t \cdot \tan\phi + L\cos\alpha \cong L\{\tan\phi \cdot \sin\alpha + \cos\alpha\} \quad (14).$$

By setting φ to the critical angle $\epsilon \equiv \sin^{-1}(1/n)$ to satisfy the total reflection condition and considering the actual size of the illumination prism 4, it is desirable to satisfy the following condition:

$$\tan\epsilon \cdot \sin\alpha + \cos\alpha < 32/L \quad (15).$$

This makes it feasible to construct the apparatus in more compact structure while preventing the illumination prism 4 from projecting toward the observer side.

In the region above the upper limit of Eq. (15), according to the backward tracing of rays from the observer's pupil, the ray transmitted by the prism lens 7 and the illumination prism 4 and thereafter reflected at the upper end of the display panel 5 is again incident to the illumination prism 4 and is reflected on the second surface 42 of the illumination prism 4. However, since the ray is reflected at the part far from the display panel 5 on the second surface 42, the illumination prism 4 becomes large in size.

Although the image display apparatus of the present embodiment is characterized by satisfying Conditions (9) and (15) described above, it is needless to mention that the present embodiment can also be carried out in a variety of combinations with the configurations described in the first to seventeenth embodiments.

Numerical Examples

Numerical Examples 10, 11 for the image display apparatus of the eighteenth embodiment will be described below.

The shapes of the optical action surfaces in Numerical Examples 10, 11 are those having an aspherical surface expressed by the shape function indicating the quadratic surface, plus the Zernike polynomials as described previously.

Numerical Example 10 is of the form used in the layout illustrated in FIG. 32.

<Numerical Example 10>
fx (focal length in the x-direction) = 17.8 ,
fy (focal length in the y-direction) = 18.9
wx (half angle of view in the x-direction) = 15.0 deg ,
wy (half angle of view in the y-direction) 11.2 deg
prism n (refractive index of the prism lens) = 1.571

| | | | |
|---|---|---|---|
| S1 | r: ∞ | d: 24.44 | n: 1.0000 |
| S2 | dY −66.11 | dZ 24.44 | Tilt −6.97 |
| | r: −460.248 | | |
| | c4 −9.304e−04 | c5: −3.211 e−04 | c9: 3.394e−07 |
| | c10: −7.294e−06 | c11: 8.999e−08 | c12: −3.540e−09 |
| | c13: −1.663e−09 | c19: −4.677e−11 | c20: −4.003e−12 |
| | c21: 7.951e−10 | c22: −2.935e−12 | c23: −1.193e−12 |
| | c24: 7.284e−13 | c25: −6.250e−13 | |
| S3 | dY −2.25 | dZ 36.12 | Tilt −29.69 |
| | r: −51.494 | | |
| | c4: −1.601e−03 | c5: −2.139e−03 | c9: −6.666e−06 |
| | c10: −8.173e−06 | c11: 5.438e−08 | c12: −3.901e−07 |
| | c13: −3.012e−07 | c19: −1.203e−08 | c20: 2.125e−09 |
| | c21: −6.631e−09 | c22: −2.517e−10 | c23: 1.007e−10 |
| | c24: −1.856e−10 | c25: −4.149e−11 | |
| S4 | dY −66.11 | dZ 24.44 | Tilt −6.97 |
| | r: −460.248 | | |
| | c4: −9.304e−04 | c5: −3.211e−04 | c9: 3.394e−07 |
| | c10: −7.294e−06 | c11: 8.999e−08 | c12: −3.540e−09 |
| | c13: −1.663e−09 | c19: −4.677e−11 | c20: −4.003e−12 |
| | c21: 7.951e−10 | c22: −2.935e−12 | c23: −1.193e−12 |
| | c24: 7.284e−13 | c25: −6.250e−13 | |
| S5 | dY 10.37 | dZ 42.98 | Tilt 40.94 |
| | r: −212.022 | | |
| | c4: 1.936e−02 | c5: −4.534e−03 | c9: −6.159e−04 |
| | c10: −7.698e−04 | c11: −5.875e−05 | c12: −5.283e−06 |

-continued

|  | c13: 2.545e−05 | c19: −2.037e−07 | c20: 2.618e−07 |
|---|---|---|---|
|  | c21: 1.569e−06 | c22: 0.000e+00 | c23: 0.000e+00 |
|  | c24: 0.000e+00 | c25: 0.000e+00 |  |
| S6 | dY 16.94 | dZ 37.28 | Tilt 48.13 |
| S6 | r: ∞ | d: −1.78 | n: 1.0000 |
| S7 | dY 15.61 | dZ 36.09 | Tilt 64.39 |
| S7 | r: ∞ | d: 3.34 | n: 1.5163 |
| S8 | dY 18.10 | dZ 38.32 | Tilt 34.39 |
| S8 | r: ∞ | d: 0.10 | n: 1.0000 |
| S9 | r: ∞ | d: 1.10 | n: 1.5230 |
| S10 | r: ∞ | d: 0.00 | n: 1.0000 |

Values of Condition (9)

$\alpha = 30.0$
$n = 1.57$
$L = 7.16$
$\epsilon = 41.3$
$\tan(\epsilon - \alpha) + \tan(\epsilon + \alpha) = 3.15 > 0.60 \ (=L/12)$ Values of Condition (15)

$\alpha = 30.0$
$n = 1.57$
$L = 7.16$
$\epsilon = 41.3$
$\tan\epsilon \cdot \sin\alpha + \cos\alpha = 1.31 < 4.47 \ (= 32/L)$
Incidence angle $\phi$: $\sin\phi = 0.70 \geq 0.66 \ (= 1/n)$ Location of the first polarizer: 0.8 mm from the first surface of the illumination prism;

air-reduced length from the image plane of the display panel: 7.7 mm ≥ 1 mm

Location of the second polarizer: 0.5 mm from the second surface of the illumination prism;

air-reduced length from the image plane of the display panel: 3.2 mm ≥ 1 mm Numerical Example 11 is of the form used in the layout illustrated in FIG. 39.

<Numerical Example 11>
fx (focal length in the x-direction) = 22.6 ,
fy (focal length in the y-direction) = 22.5
wx (half angle of view in the x-direction) = 9.0 deg ,
wy (half angle of view in the y-direction) = 12.0 deg
prism n (refractive index of the prism lens) = 1.571

| S1 | r: ∞ | d: 31.56 | n: 1.0000 |
|---|---|---|---|
| S2 | dY 1.46 | dZ 31.56 | Tilt 5.98 |
|  | r: −114.717 |  |  |
|  | c4: −2.212e−03 | c5: −1.249e−03 | c9: −7.747e−05 |
|  | c10: 2.639e−05 | c11: −1.532e−06 | c12: 1.469e−06 |
|  | c13: −1.899e−06 | c19: −3.953e−08 | c20: −1.158e−08 |
|  | c21: −2.287e−07 | c22: 5.759e−09 | c23: −2.109e−09 |
|  | c24: 1.554e−09 | c25: −5.815e−10 |  |
| S3 | dY 0.08 | dZ 40.90 | Tilt −20.02 |
|  | r: −41.444 |  |  |
|  | c4: −1.043e−03 | c5: 1.010e−04 | c9: −4.528e−06 |
|  | c10: 5.442e−06 | c11: −1.857e−07 | c12: 4.407e−07 |
|  | c13: −4.390e−07 | c19: 2.782e−08 | c20: −4.086e−08 |
|  | c21: 1.712e−08 | c22: 6.484e−10 | c23: −4.474e−10 |
|  | c24: 6.306e−10 | c25: −2.124e−10 |  |
| S4 | dY 7.46 | dZ 31.56 | Tilt 5.98 |
|  | r: −114.711 |  |  |
|  | c4: −2.212e−03 | c5: −1.249e−03 | c9: −7.747e−05 |
|  | c10: 2.639e−05 | c11: −1.532e−06 | c12: 1.469e−06 |
|  | c13: 1.899e−06 | c19: −3.953e−08 | c20: −1.158e−08 |
|  | c21: −2.287e−07 | c22: 5.759e−09 | c23: −2.109e−09 |
|  | c24: 1.554e−09 | c25: −5.815e−10 |  |
| S5 | dY 15.11 | dZ 38.83 | Tilt 68.87 |
|  | r: 37.281 |  |  |
|  | c4: 1.192e−02 | c5: 8.644e−04 | c9: −5.232e−04 |
|  | c10: 1.041 e−04 | c11: −2.871e−06 | c12: 1.514e−05 |
|  | c13: 6.027e−06 | c19: −1.216e−07 | c20: 4.707e−07 |

-continued

|  | c21: −5.263e−06 | c22: −3.467e−07 | c23: −7.974e−09 |
|---|---|---|---|
|  | c24: −3.626e−08 | c25: −3.647e−09 |  |
| S6 | dY 16.23 | dZ 38.72 | Tilt 18.60 |
| S6 | r: ∞ | d: −0.20 | n: 1.0000 |
| S7 | dY 16.17 | dZ 38.53 | Tilt 73.71 |
| S7 | r: ∞ | d: 3.50 | n: 1.5163 |
| S8 | dY 17.28 | dZ 41.85 | Tilt 38.73 |
| S8 | r: ∞ | d: 0.10 | n: 1.0000 |
| S9 | dY 20.07 | dZ 39.74 | Tilt 38.73 |
| S9 | r: ∞ | d: 1.10 | n: 1.5230 |
| S10 | r ∞ | d: 0.00 | n: 1.0000 |

Values of Condition (9)

$\alpha = 35.0$
$n = 1.57$
$L = 9.55$
$s = 41.3$
$\tan(\epsilon - \alpha) + \tan(\epsilon + \alpha) = 4.21 > 0.80 \ (=L/12)$ Values of Condition (15)

$\alpha = 35.0$
$n = 1.57$
$L = 9.55$
$\epsilon = 41.3$
$\tan\epsilon \cdot \sin\alpha + \cos\alpha = 1.32 < 3.35 \ (= 32/L)$
Incidence angle $\phi$: $\sin\phi = 0.74 \geq 0.66 \ (=1/n)$ Incidence angle $\phi$: $\sin\phi = 0.74 \geq 0.66 \ (=1/n)$.

Location of the first polarizer: 0.8 mm from the first surface of the illumination prism;

air-reduced length from the image plane of the display panel: 9.9 mm ≥ 1 mm.

Location of the second polarizer: 0.5 mm from the second surface of the illumination prism;

air-reduced length from the image plane of the display panel: 3.9 mm ≥ 1 mm.

According to the embodiment described above, since the apparatus is constructed to satisfy the following condition:

$$\tan(\epsilon-\alpha) + \tan(\epsilon+\alpha) > L/12,$$

where $\epsilon \equiv \sin^{-1}(1/n)$, it becomes feasible to realize the image display apparatus capable of display of image with good quality in wide angles of view while preventing the illumination light incident from the light source to the light guide element from being eclipsed by the image display element before illuminating the reflective image display element, in the compact structure.

When the apparatus is constructed to satisfy the following condition:

$$\tan\epsilon \cdot \sin\alpha + \cos\alpha < 32/L,$$

where $\epsilon \equiv \sin^{-1}(1/n)$, the apparatus can be constructed in more compact structure while preventing projection of the light guide element toward the observer side.

These make it feasible to realize the image display apparatus of very simple structure with wide angles of view and without occurrence of unwanted flare while well correcting the aberrations and compact image display apparatus using the reflective image display element ready for high-definition images of personal computers and the like.

What is claimed is:

1. An image display apparatus comprising:
   a light source for supplying illumination light;
   a reflective display element for reflecting and modulating said illumination light into image light;

a first optical system for guiding said illumination light to said reflective display element; and a second optical system for guiding said image light to an observer, wherein said first optical system has an optical element comprising a first surface on which said illumination light is incident, a second surface for totally reflecting the light incident on the first surface, and a third surface from which the light totally reflected by the second surface emerges toward said reflective display element, and said image light is again incident through said third surface on said optical element and emerges from said second surface toward said second optical system, and wherein said optical element has a function of preventing unnecessary light from being guided to the observer.

2. The image display apparatus according to claim 1, wherein an antireflection coating is provided on a surface without optical action of said optical element whereby said optical element prevents the unnecessary light from being guided to the observer.

3. The image display apparatus according to claim 2, wherein said surface without optical action is a side surface of said optical element intersecting with said first surface, second surface, and third surface.

4. The image display apparatus according to claim 1, wherein a light absorbing film is provided on a surface without optical action of said optical element whereby said optical element prevents the unnecessary light from being guided to the observer.

5. The image display apparatus according to claim 4, wherein said surface without optical action is a side surface of said optical element intersecting with said first surface, second surface, and third surface.

6. The image display apparatus according to claim 1, wherein a surface without optical action of said optical element is made as a diffusing surface whereby said optical element prevents the unnecessary light from being guided to the observer.

7. The image display apparatus according to claim 6, wherein said surface without optical action is a side surface of said optical element intersecting with said first surface, second surface, and third surface.

8. The image display apparatus according to claim 6, wherein said optical element has a light absorbing film on said diffusing surface.

9. The image display apparatus according to claim 1, wherein a passing region of said illumination light and a passing region of said image light overlap in part with each other between said second surface and third surface of said optical element.

10. The image display apparatus according to claim 1, wherein an angle between said second surface and third surface of said optical element is not less than 15° nor more than 45°.

11. The image display apparatus according to claim 1, which satisfies the following condition:

$$\tan(\epsilon-\alpha)+\tan(\epsilon+\alpha)>L/12,$$

where $\epsilon \equiv \sin^{-1}(1/n)$, where $\alpha$ is an angle between said second surface and third surface of said optical element, n a refractive index of said optical element, and L (mm) a length of a side of said reflective display element.

12. The image display apparatus according to claim 1, which satisfies the following condition:

$$\tan\epsilon \cdot \sin\alpha + \cos\alpha < 32/L,$$

where $\epsilon \equiv \sin^{-1}(1/n)$, where $\alpha$ is an angle between said second surface and third surface of said optical element, n a refractive index of said optical element, and L (mm) a length of a side of said reflective display element.

13. The image display apparatus according to claim 1, which satisfies the following conditions:

$$\tan(\epsilon-\alpha)+\tan(\epsilon+\alpha)>L/12$$

and $$\tan\epsilon \cdot \sin\alpha + \cos\alpha < 32/L,$$

where $\epsilon \equiv \sin^{-1}(1/n)$, where $\alpha$ is an angle between said second surface and third surface of said optical element, n a refractive index of said optical element, and L (mm) a length of a side of said reflective display element.

14. An image display apparatus comprising:

a light source for supplying illumination light;

a reflective display element for reflecting and modulating said illumination light into image light;

a first optical system for guiding said illumination light to said reflective display element; and a second optical system for guiding said image light to an observer, wherein said first optical system has an optical element comprising a first surface on which said illumination light is incident, a second surface for totally reflecting the light incident on the first surface, and a third surface from which the light totally reflected by the second surface emerges toward said reflective display element, and said image light is again incident through said third surface on said optical element and emerges from said second surface toward said second optical system, and wherein a side surface of said optical element is a diffusing surface.

15. An image display apparatus comprising:

a light source for supplying illumination light;

a reflective display element for reflecting and modulating said illumination light into image light;

a first optical system for guiding said illumination light to said reflective display element; and a second optical system for guiding said image light to an observer, wherein said first optical system has an optical element comprising a first surface on which said illumination light is incident, a second surface for totally reflecting the light incident on the first surface, and a third surface from which the light totally reflected by the second surface emerges toward said reflective display element, and said image light is again incident through said third surface on said optical element and emerges from said second surface toward said second optical system, and wherein a light absorbing film is provided on a side surface of said optical element.

16. An image display apparatus comprising:

a light source for supplying illumination light;

a reflective liquid crystal display element for reflecting and modulating said illumination light into image light;

a first optical system for guiding said illumination light to said reflective liquid crystal display element;

a second optical system for guiding said image light to an observer; and a polarizing member for converting said illumination light into polarized light and/or for analyzing out said image light, wherein said first optical system has an optical element comprising a first surface on which said illumination light is incident, a second surface for totally reflecting the light incident on the first surface, and a third surface from which the light totally reflected by the second surface emerges toward said reflective liquid crystal display element, and said image light is again incident through said third surface on said optical element and emerges from said second surface toward said second optical system, and wherein said polarizing member is located at a position satisfying the following condition:

$$I1/I0 < 0.1,$$

where I0 is a light intensity on said reflective liquid crystal display element and I1 a light intensity on said polarizing member, of light incident from the observer side into said second optical system.

17. The image display apparatus according to claim 16, wherein said polarizing member consists of a first polarizing member for converting said illumination light into polarized light and a second polarizing member for analyzing out said image light, said first polarizing member is placed on the incidence side of the first surface of said optical element, and said second polarizing member is placed between said optical element and said second optical system.

18. An image display apparatus comprising:

a light source for supplying illumination light;

a reflective display element for reflecting and modulating said illumination light into image light;

a first optical system for guiding said illumination light to said reflective display element; and a second optical system for guiding said image light to an observer, wherein said first optical system has an optical element comprising a first surface on which said illumination light is incident, a second surface for totally reflecting the light incident on the first surface, and a third surface from which the light totally reflected by the second surface emerges toward said reflective display element, and said image light is again incident through said third surface on said optical element and emerges from said second surface toward said second optical system, and wherein said first optical system comprises a lens array consisting of a plurality of microlens elements and said lens array forms secondary light sources from the light from said light source.

19. An optical system comprising:

a first optical system for guiding illumination light to a reflective display element; and a second optical system for guiding image light reflected by said reflective display element, to an observer, wherein said first optical system has an optical element comprising a first surface on which said illumination light is incident, a second surface for totally reflecting the light incident on the first surface, and a third surface from which the light totally reflected by the second surface emerges toward said reflective display element, and said image light is again incident through said third surface on said optical element and emerges from said second surface toward said second optical system, and wherein said optical element has a function of preventing unnecessary light from being guided to the observer.

20. An optical system comprising:

a first optical system for guiding illumination light to a reflective display element; and a second optical system for guiding image light reflected by said reflective display element, to an observer, wherein said first optical system has an optical element comprising a first surface on which said illumination light is incident, a second surface for totally reflecting the light incident on the first surface, and a third surface from which the light totally reflected by the second surface emerges toward said reflective display element, and said image light is again incident through said third surface on said optical element and emerges from said second surface toward said second optical system, and wherein a side surface of said optical element is a diffusing surface.

21. An optical system comprising:

a first optical system for guiding illumination light to a reflective display element; and a second optical system for guiding image light reflected by said reflective display element, to an observer, wherein said first optical system has an optical element comprising a first surface on which said illumination light is incident, a second surface for totally reflecting the light incident on the first surface, and a third surface from which the light totally reflected by the second surface emerges toward said reflective display element, and said image light is again incident through said third surface on said optical element and emerges from said second surface toward said second optical system, and wherein a light absorbing film is provided on a side surface of said optical element.

* * * * *

UNITED STATES PATENT AND TRADEMARK OFFICE
CERTIFICATE OF CORRECTION

PATENT NO. : 6,490,095 B2
DATED : December 3, 2002
INVENTOR(S) : Atsushi Okuyama et al.

It is certified that error appears in the above-identified patent and that said Letters Patent is hereby corrected as shown below:

Title page,
Item [56], References Cited, U.S. PATENT DOCUMENTS, "5/1972 La Russa" should read -- 3/1972 La Russa --, and "4/1997 Matasumura et al" should read -- 4/1997 Matsumura et al. --.

Column 1,
Line 53, "angle a" should read -- angle α --.

Column 11,
Line 5, "$+c'22x6$" should read -- $+c'22x^6$ --.
Line 36, "cl3: –4.186e–01" should read -- cl3: –4.186e–07 --.
Line 50, "dZ 38.44 Tilt   71.34" should read -- dZ 38.44   Tilt 71.34 --.

Column 12,
Line 5, "c11: –7.053e–06" should read -- c'11: –7.053e–06 --.
Line 15, "c15: –2.330e–04" should read -- c'15: –2.330e–04 --.
Line 32, "c'19: –4.01 5e–07" should read -- c'19: –4.015e–07 --.
Line 37, "c'19: –1.285e–08" should read -- c'19: –7.285e–08 --.
Line 47, "C'22: 0.000e+00" should read -- c'22: 0.000e+00 --.
Line 66, "c25: 1.758e–11" should read -- c25: –1.758e–11 --.

Column 13,
Line 5, "r: –361.524" should read -- r: –367.524 --.

Column 20,
Line 14, "c11: 1.565e–07" should read -- c11: –1.565e–07 --.
Line 19, "c5 1.218e–03" should read -- c15: 1.218e–03 --.
Line 58, "c12: 3.545e–09" should read -- c12: –3.545e–09 --.

Column 21,
Line 20, "r:" should read -- r: ∞ --.

Column 22,
Line 14, "r" should read -- r: --.

UNITED STATES PATENT AND TRADEMARK OFFICE
CERTIFICATE OF CORRECTION

PATENT NO. : 6,490,095 B2
DATED : December 3, 2002
INVENTOR(S) : Atsushi Okuyama et al.

It is certified that error appears in the above-identified patent and that said Letters Patent is hereby corrected as shown below:

<u>Column 26,</u>
Line 53, "dZ  36.12" should read -- dZ  36.72 --.
Line 55, "c10: –8.1 73e–06" should read -- c10: –8.173e–06 --.

<u>Column 27,</u>
Line 30, "mm$\geq$1 mm" should read -- mm$\geq$1 mm. --.
Line 46, "dY  1.46" should read -- dY  7.46 --.
Line 55, "c21: 1.712e–08" should read -- c12: 1.772e–08 --.
Line 57, "r: 114.711" should read -- r: 114.717 --.
Line 60, "c13: 1.899e–06" should read -- c13: –1.899e–06 --.

<u>Column 28,</u>
Line 11, "r    $\infty$" should read -- r: $\infty$ --.

Signed and Sealed this

Fifth Day of August, 2003

JAMES E. ROGAN
*Director of the United States Patent and Trademark Office*